United States Patent
Ibrahim et al.

(10) Patent No.: US 12,368,484 B2
(45) Date of Patent: Jul. 22, 2025

(54) CROSS LINK INTERFERENCE BASED CHANNEL STATE INFORMATION REPORTING

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Seyedkianoush Hosseini, San Diego, CA (US); Ahmed Attia Abotabl, San Diego, CA (US); Mostafa Khoshnevisan, San Diego, CA (US); Krishna Kiran Mukkavilli, San Diego, CA (US); Wanshi Chen, San Diego, CA (US); Thomas Valerrian Pasca Santhappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 17/827,540

(22) Filed: May 27, 2022

(65) Prior Publication Data
US 2023/0387990 A1    Nov. 30, 2023

(51) Int. Cl.
*H04B 7/06* (2006.01)
*H04B 17/336* (2015.01)
*H04L 5/00* (2006.01)
*H04W 24/10* (2009.01)

(52) U.S. Cl.
CPC ........ *H04B 7/0626* (2013.01); *H04B 7/0639* (2013.01); *H04B 17/336* (2015.01); *H04L 5/0051* (2013.01); *H04W 24/10* (2013.01)

(58) Field of Classification Search
CPC .. H04B 17/309; H04B 17/336; H04B 17/345; H04B 17/346; H04B 17/347; H04B 17/354; H04W 24/10
See application file for complete search history.

(56) References Cited

U.S. PATENT DOCUMENTS

| | | | |
|---|---|---|---|
| 2020/0228212 A1* | 7/2020 | Xu | H04L 27/2602 |
| 2023/0387989 A1 | 11/2023 | Ibrahim et al. | |
| 2023/0388837 A1 | 11/2023 | Ibrahim et al. | |

* cited by examiner

*Primary Examiner* — Bo Hui A Zhu
(74) *Attorney, Agent, or Firm* — Holland & Hart LLP

(57) ABSTRACT

Methods, systems, and devices for wireless communications are described. A user equipment (UE) may transmit channel state information (CSI) that is based on an estimated cross link interference (CLI) at the UE. For example, a network entity may indicate, to a first UE and a second UE, transmission parameters of a multi-port CLI-reference signal (CLI-RS) that is associated with estimation of CLI channel between the first UE and the second UE. The network entity may indicate, to the first UE, one or more precoding parameters associated with uplink precoding at the second UE. The second UE may transmit the multi-port CLI-RS to the first UE, and the network entity may transmit a CSI-reference signal (CSI-RS) to the first UE. The first UE may transmit a report that includes CSI based on the multi-port CLI-RS, the CSI-RS, and the one or more precoding parameters.

30 Claims, 23 Drawing Sheets

CROSS LINK INTERFERENCE BASED CHANNEL STATE INFORMATION REPORTING

INTRODUCTION

The following relates to wireless communications, including channel state information (CSI) management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communication at a first UE is described. The method may include obtaining one or more control messages indicating one or more transmission parameters of a multi-port reference signal associated with estimation of a cross link interference (CLI) channel between the first UE and a second UE and indicating one or more precoding parameters associated with uplink precoding at the second UE, where the one or more transmission parameters of the multi-port reference signal indicate a quantity of two or more antenna ports for communicating the multi-port reference signal. The method may further include obtaining, using the quantity of two or more antenna ports, the multi-port reference signal associated with estimation of the CLI channel between the first UE and the second UE based on the one or more transmission parameters. The method may further include obtaining a CSI-reference signal (CSI-RS) associated with estimation of a channel between the first UE and a network entity. The method may further include outputting a report including CSI that is based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

An apparatus for wireless communication at a first UE is described. The apparatus may include a processor and memory coupled with the processor, the processor configured to obtain one or more control messages indicating one or more transmission parameters of a multi-port reference signal associated with estimation of a CLI channel between the first UE and a second UE and indicating one or more precoding parameters associated with uplink precoding at the second UE, where the one or more transmission parameters of the multi-port reference signal indicate a quantity of two or more antenna ports for communicating the multi-port reference signal. The processor may be further configured to obtain, using the quantity of two or more antenna ports, the multi-port reference signal associated with estimation of the CLI channel between the first UE and the second UE based on the one or more transmission parameters. The processor may be further configured to obtain a CSI-RS associated with estimation of a channel between the first UE and a network entity. The processor may be further configured to output a report including CSI that is based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

Another apparatus for wireless communication at a first UE is described. The apparatus may include means for obtaining one or more control messages indicating one or more transmission parameters of a multi-port reference signal associated with estimation of a CLI channel between the first UE and a second UE and indicating one or more precoding parameters associated with uplink precoding at the second UE, where the one or more transmission parameters of the multi-port reference signal indicate a quantity of two or more antenna ports for communicating the multi-port reference signal. The apparatus may further include means for obtaining, using the quantity of two or more antenna ports, the multi-port reference signal associated with estimation of the CLI channel between the first UE and the second UE based on the one or more transmission parameters. The apparatus may further include means for obtaining a CSI-RS associated with estimation of a channel between the first UE and a network entity. The apparatus may further include means for outputting a report including CSI that is based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

A non-transitory computer-readable medium storing code for wireless communication at a first UE is described. The code may include instructions executable by a processor to obtain one or more control messages indicating one or more transmission parameters of a multi-port reference signal associated with estimation of a CLI channel between the first UE and a second UE and indicating one or more precoding parameters associated with uplink precoding at the second UE, where the one or more transmission parameters of the multi-port reference signal indicate a quantity of two or more antenna ports for communicating the multi-port reference signal. The code may include further instructions executable by the processor to obtain, using the quantity of two or more antenna ports, the multi-port reference signal associated with estimation of the CLI channel between the first UE and the second UE based on the one or more transmission parameters. The code may include further instructions executable by the processor to obtain a CSI-RS associated with estimation of a channel between the first UE and a network entity. The code may include further instructions executable by the processor to output a report including CSI that is based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

Some examples of the method, apparatuses, and non-transitory computer-readable medium described herein may further include operations, features, means, or instructions for outputting a capability message indicating a capability of the first UE to estimate the CLI channel based on the multi-port reference signal, where the one or more control messages indicating the one or more transmission parameters of the multi-port reference signal may be obtained based at least in part the capability message.

Some examples of the method, apparatuses, and non-transitory computer-readable medium described herein may further include operations, features, means, or instructions for generating the CSI based on the one or more control messages including an indication for the first UE to generate the CSI based on the multi-port reference signal, the CSI-RS, and the one or more precoding parameters.

Some examples of the method, apparatuses, and non-transitory computer-readable medium described herein may further include operations, features, means, or instructions for generating, based on the one or more transmission parameters of the multi-port reference signal indicating a measurement resource for the multi-port reference signal, the CSI based on the multi-port reference signal, the CSI-RS, and the one or more precoding parameters.

Some examples of the method, apparatuses, and non-transitory computer-readable medium described herein may further include operations, features, means, or instructions for estimating the channel between the first UE and the network entity based on the CSI reference signal, the CLI channel, and the one or more precoding parameters associated with uplink precoding at the second UE, the CSI based on the estimated channel.

Some examples of the method, apparatuses, and non-transitory computer-readable medium described herein may further include operations, features, means, or instructions for estimating the channel between the first UE and the network entity using a linear transformation associated with uncorrelation of antenna ports of the first UE used to receive the CSI-RS, the linear transformation based on the CLI channel and the one or more precoding parameters associated with uplink precoding at the second UE and computing a spectral efficiency associated with candidate CSI based on the linear transformation, the report including the candidate CSI based on the computed spectral efficiency.

Some examples of the method, apparatuses, and non-transitory computer-readable medium described herein may further include operations, features, means, or instructions for obtaining downlink control information (DCI) that triggers reporting of the CSI that may be based on the multi-port reference signal, the CSI-RS, and the one or more precoding parameters associated with uplink precoding at the second UE.

In some examples of the method, apparatuses, and non-transitory computer-readable medium described herein, the multi-port reference signal associated with estimation of the CLI channel may be a sounding reference signal (SRS).

In some examples of the method, apparatuses, and non-transitory computer-readable medium described herein, the quantity of two or more antenna ports corresponds to a quantity of transmission antenna ports at the second UE.

In some examples of the method, apparatuses, and non-transitory computer-readable medium described herein, the CSI includes a precoding matrix indicator (PMI), a channel quality indicator (CQI), a rank indicator (RI), or a combination thereof, that may be selected based on the multi-port reference signal, the CSI-RS, and the one or more precoding parameters associated with uplink precoding at the second UE.

A method for wireless communication at a second UE is described. The method may include obtaining a control message indicating one or more transmission parameters of a multi-port reference signal associated with estimation of a CLI channel between the second UE and a first UE, where the one or more transmission parameters of the multi-port reference signal indicate a quantity of two or more antenna ports for communicating the multi-port reference signal. The method may further include outputting, using the quantity of two or more antenna ports, the multi-port reference signal associated with estimation of the CLI channel between the second UE and the first UE based on the one or more transmission parameters.

An apparatus for wireless communication at a second UE is described. The apparatus may include a processor and memory coupled with the processor, the processor configured to obtain a control message indicating one or more transmission parameters of a multi-port reference signal associated with estimation of a CLI channel between the second UE and a first UE, where the one or more transmission parameters of the multi-port reference signal indicate a quantity of two or more antenna ports for communicating the multi-port reference signal. The processor may be further configured to output, using the quantity of two or more antenna ports, the multi-port reference signal associated with estimation of the CLI channel between the second UE and the first UE based on the one or more transmission parameters.

Another apparatus for wireless communication at a second UE is described. The apparatus may include means for obtaining a control message indicating one or more transmission parameters of a multi-port reference signal associated with estimation of a CLI channel between the second UE and a first UE, where the one or more transmission parameters of the multi-port reference signal indicate a quantity of two or more antenna ports for communicating the multi-port reference signal. The apparatus may further include means for outputting, using the quantity of two or more antenna ports, the multi-port reference signal associated with estimation of the CLI channel between the second UE and the first UE based on the one or more transmission parameters.

A non-transitory computer-readable medium storing code for wireless communication at a second UE is described. The code may include instructions executable by a processor to obtain a control message indicating one or more transmission parameters of a multi-port reference signal associated with estimation of a CLI channel between the second UE and a first UE, where the one or more transmission parameters of the multi-port reference signal indicate a quantity of two or more antenna ports for communicating the multi-port reference signal. The code may further include instructions executable by the processor to output, using the quantity of two or more antenna ports, the multi-port reference signal associated with estimation of the CLI channel between the second UE and the first UE based on the one or more transmission parameters.

Some examples of the method, apparatuses, and non-transitory computer-readable medium described herein may further include operations, features, means, or instructions for obtaining a second control message that triggers communication of the multi-port reference signal, where the multi-port reference signal may be output in response to the second control message.

In some examples of the method, apparatuses, and non-transitory computer-readable medium described herein, the second control message includes DCI that schedules an aperiodic resource for communicating the multi-port reference signal or DCI that activates a semi-persistent scheduling (SPS) resource for communicating the multi-port reference signal.

In some examples of the method, apparatuses, and non-transitory computer-readable medium described herein, outputting the multi-port reference signal may include operations, features, means, or instructions for outputting the multi-port reference signal using an SRS codebook indicated by the one or more transmission parameters, the SRS codebook associated with uplink transmissions to a network entity.

In some examples of the method, apparatuses, and non-transitory computer-readable medium described herein, the multi-port reference signal is a multi-port SRS. In some examples of the method, apparatuses, and non-transitory computer-readable medium described herein, outputting the multi-port reference signal may include operations, features, means, or instructions for outputting the multi-port SRS using a beam having a first beam width that may be greater than a second beam width associated with SRS transmissions to a network entity.

In some examples of the method, apparatuses, and non-transitory computer-readable medium described herein, the multi-port reference signal may be an SRS configured to enable the estimation of the CLI channel.

Some examples of the method, apparatuses, and non-transitory computer-readable medium described herein may further include operations, features, means, or instructions for obtaining a second control message indicating a transmission precoding matrix indicator (TPMI) associated with precoding of an uplink message, the TPMI based on the CLI channel between the second UE and the first UE and outputting an uplink message using a precoding matrix indicated by the TPMI.

In some examples of the method, apparatuses, and non-transitory computer-readable medium described herein, the quantity of two or more antenna ports corresponds to a quantity of transmission antenna ports at the second UE.

A method for wireless communication at a network entity is described. The method may include outputting one or more control messages indicating one or more transmission parameters of a multi-port reference signal associated with estimation of a CLI channel between a first UE and a second UE and indicating one or more precoding parameters associated with uplink precoding at the second UE, where the one or more transmission parameters of the multi-port reference signal indicate a quantity of two or more antenna ports for communicating the multi-port reference signal. The method may further include outputting a CSI-RS associated with estimation of a channel between the first UE and the network entity. The method may further include obtaining a report including CSI associated with the channel between the first UE and the network entity, the CSI based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

An apparatus for wireless communication at a network entity is described. The apparatus may include a processor and memory coupled with the processor, the processor configured to output one or more control messages indicating one or more transmission parameters of a multi-port reference signal associated with estimation of a CLI channel between a first UE and a second UE and indicating one or more precoding parameters associated with uplink precoding at the second UE, where the one or more transmission parameters of the multi-port reference signal indicate a quantity of two or more antenna ports for communicating the multi-port reference signal. The processor may be further configured to output a CSI-RS associated with estimation of a channel between the first UE and the network entity. The processor may be further configured to obtain a report including CSI associated with the channel between the first UE and the network entity, the CSI based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

Another apparatus for wireless communication at a network entity is described. The apparatus may include means for outputting one or more control messages indicating one or more transmission parameters of a multi-port reference signal associated with estimation of a CLI channel between a first UE and a second UE and indicating one or more precoding parameters associated with uplink precoding at the second UE, where the one or more transmission parameters of the multi-port reference signal indicate a quantity of two or more antenna ports for communicating the multi-port reference signal. The apparatus may further include means for outputting a CSI-RS associated with estimation of a channel between the first UE and the network entity. The apparatus may further include means for obtaining a report including CSI associated with the channel between the first UE and the network entity, the CSI based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

A non-transitory computer-readable medium storing code for wireless communication at a network entity is described. The code may include instructions executable by a processor to output one or more control messages indicating one or more transmission parameters of a multi-port reference signal associated with estimation of a CLI channel between a first UE and a second UE and indicating one or more precoding parameters associated with uplink precoding at the second UE, where the one or more transmission parameters of the multi-port reference signal indicate a quantity of two or more antenna ports for communicating the multi-port reference signal. The code may further include instructions executable by the processor to output a CSI-RS associated with estimation of a channel between the first UE and the network entity. The code may further include instructions executable by the processor to obtain a report including CSI associated with the channel between the first UE and the network entity, the CSI based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

Some examples of the method, apparatuses, and non-transitory computer-readable medium described herein may further include operations, features, means, or instructions for obtaining a capability message that indicates a capability of the first UE to estimate the CLI channel based on the multi-port reference signal, where the one or more control messages that indicate the one or more transmission parameters of the multi-port reference signal may be output based at least in part the capability message.

Some examples of the method, apparatuses, and non-transitory computer-readable medium described herein may further include operations, features, means, or instructions for outputting a second control message that triggers communication of the multi-port reference signal.

In some examples of the method, apparatuses, and non-transitory computer-readable medium described herein, the second control message includes DCI that schedules an aperiodic resource for communicating the multi-port reference signal or DCI that activates an SPS resource for communicating the multi-port reference signal.

Some examples of the method, apparatuses, and non-transitory computer-readable medium described herein may further include operations, features, means, or instructions for outputting DCI triggering reporting of the CSI that may be based on the multi-port reference signal, the CSI-RS, and the one or more precoding parameters associated with uplink precoding at the second UE.

In some examples of the method, apparatuses, and non-transitory computer-readable medium described herein, the one or more transmission parameters of the multi-port reference signal indicate an SRS codebook for communicating the multi-port reference signal.

In some examples of the method, apparatuses, and non-transitory computer-readable medium described herein, the one or more transmission parameters of the multi-port reference signal indicate a beam for communicating the multi-port reference signal, the beam having a first beam width that may be greater than a second beam width associated with SRS transmissions to the network entity.

In some examples of the method, apparatuses, and non-transitory computer-readable medium described herein, the multi-port reference signal associated with estimation of the CLI channel may be an SRS.

Some examples of the method, apparatuses, and non-transitory computer-readable medium described herein may further include operations, features, means, or instructions for outputting a second control message including a TPMI associated with precoding an uplink message at the second UE, the TPMI based on the CSI associated with the channel between the first UE and the network entity and obtaining an uplink message in accordance with a precoding matrix indicated by the TPMI.

DETAILED DESCRIPTION

Figure 1:
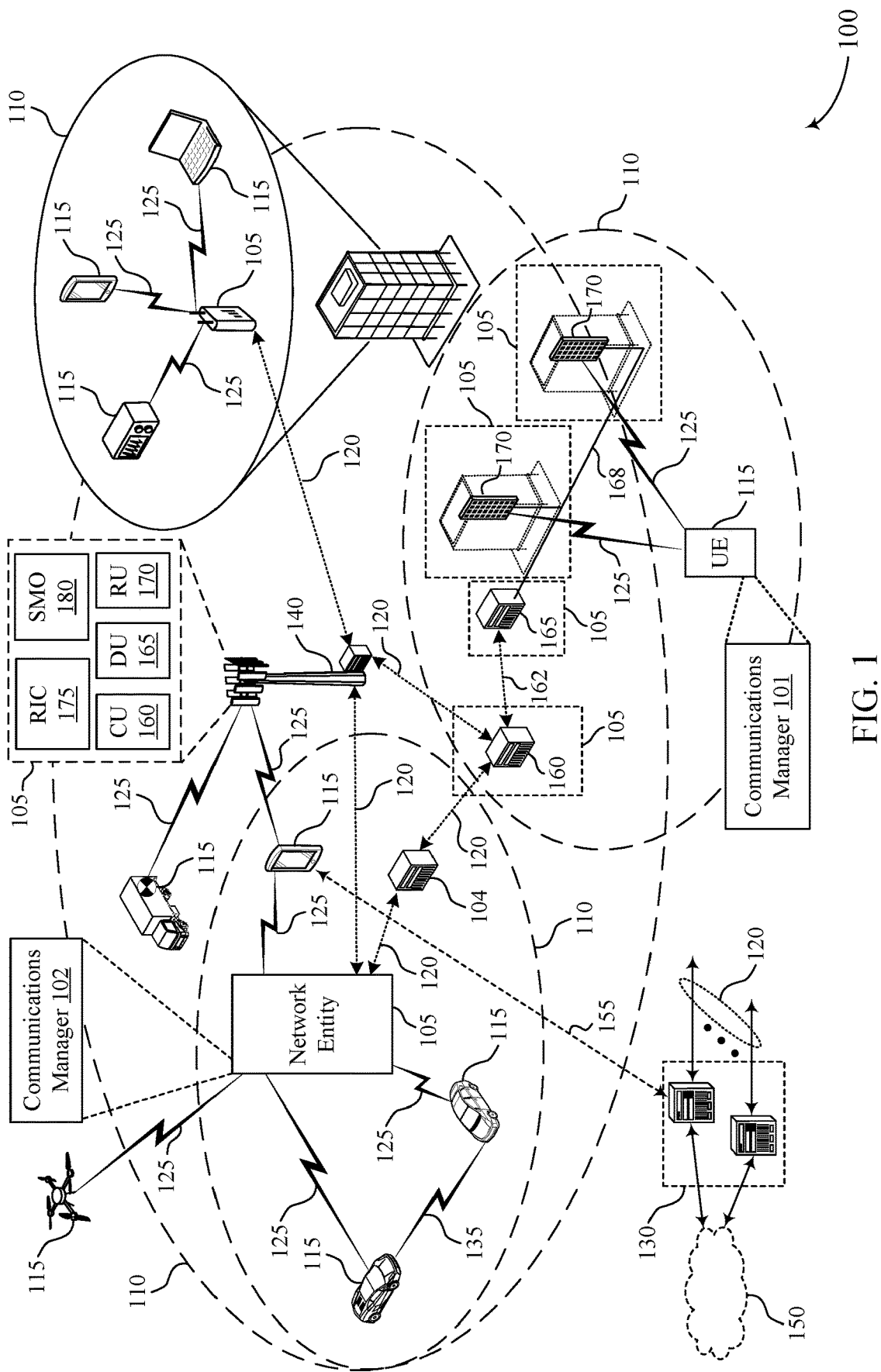
FIG. 1 illustrates an example of a wireless communications system that supports CLI based CSI reporting in accordance with one or more aspects of the present disclosure.

Some wireless communications systems may support full duplex communications in which downlink messages and uplink messages are concurrently communicated in time (e.g., simultaneously communicated in time, communicated via fully or partially overlapping time resources). For example, a network entity, such as a base station, may concurrently transmit a downlink message to a first user equipment (UE) and receive an uplink message from a second UE, among other examples of full duplex communications. In some cases, full duplex communications may result in CLI at one or more communication devices. For example, CLI may refer to interference between concurrently communicated uplink and downlink messages, where the uplink message is transmitted by a different communication device than a communication device to which the downlink message is transmitted, or vice versa. For instance, if a first UE (e.g., a victim UE) receives a downlink message from a network entity concurrent with a second UE (e.g., an aggressor UE) transmitting an uplink message to the network entity (e.g., or another network entity), the uplink message may interfere with the downlink message at the first UE such that a reliability (e.g., signal quality) of the downlink message received by the first UE is reduced. Such interference may be an example of CLI. CLI may degrade a signal quality of full duplex communications (e.g., at a receiving device), for example, by adding additional noise to a channel between communication devices, thereby reducing a reliability of full duplex communications.

Techniques, systems, and devices are described herein for enhanced channel state feedback reporting in which a UE may report CSI that is based on estimated CLI. For example, a network entity may indicate, to a first UE and a second UE, transmission parameters of a multi-port reference signal associated with estimation of a CLI channel between the first UE and the second UE, which may be referred to as a CLI-reference signal (CLI-RS) (e.g., a multi-port CLI-RS). For example, a multi-port reference signal may be a reference signal that is communicated using two or more antenna ports at each of a transmitting device and a receiving device. The CLI channel may be a CLI channel matrix $H_{CLI}$, with each row of the CLI channel matrix $H_{CLI}$ corresponding to an antenna port via which the multi-port reference signal is received, that the first UE may estimate (e.g., compute, sound) based on measurements of the multi-port CLI-RS and use in estimation of CLI at the first UE.

For example, the network entity may indicate, to the first UE, precoding parameters associated with uplink precoding at the second UE, which the first UE may use to estimate the CLI in conjunction with the estimated CLI channel. For instance, the precoding parameters may be precoding matrices which are candidates for use by the second UE to transmit a full duplex uplink message to the network entity (e.g., or another network entity). Based on the estimated CLI channel and a candidate precoding matrix, the first UE may estimate the CLI at the first UE if the second UE were to transmit an uplink message using the candidate precoding matrix. As such, the first UE may receive the multi-port CLI-RS from the second UE, which the first UE may measure and use to estimate the CLI channel. The first UE may also receive a CSI-RS from the network entity, which the first UE may measure and use to estimate a channel between the first UE and the network entity based on measurements of the CSI-RS. The first UE may generate CSI based on the estimated CLI and the estimated channel between the first UE and the network entity and may transmit a CSI report to the network entity that includes the CSI.

The reporting CSI to a network entity by a UE that is based on estimated CLI at the UE, parameters associated with full duplex communications may be configured (e.g., selected, adjusted, indicated) such that the impact of CLI on the full duplex communications may be reduced. For instance, based on the CSI reported by the first UE, the network entity (e.g., or another network entity) may transmit a TPMI to the second UE that indicates a precoding matrix for the second UE to use in transmitting an uplink message to the network entity such that CLI at the first UE and associated with the uplink message may be reduced or mitigated. As a result, a reliability (e.g., signal quality) of a downlink message that is received at the first UE concurrent with the transmission of the uplink message by the second UE (e.g., a full duplex downlink message) may be increased based on the CLI reduction. Additionally or alternatively, the network entity may transmit the full duplex downlink message such that the impact of CLI is reduced at the first UE, for example, by transmitting the full duplex downlink message using a transmission power (e.g., increased relative to a), precoding parameters, or beamforming weights, among other communication parameters, such that the reliability of the full duplex downlink message is increased. Additionally or alternatively, the network entity may schedule (e.g., reschedule) the uplink message or the downlink message such that they are not concurrently communicated, thereby eliminating the CLI caused by the uplink message.

By increasing downlink message reliability, full duplex communication reliability at a UE may be increased, which may result in increased data rates, increased spectral efficiency, increased capacity, and reduced latency. For example, due to more reliably supporting concurrent communication of uplink and downlink messages, higher coding rates, higher order modulation schemes, or both, may be supported in communicating full duplex messages, thereby increasing data rates, spectral efficiency, and capacity and reducing latency. Additionally, increased downlink message and full duplex communication reliability may result in reduced message failures, which may reduce retransmissions or other signaling associated with message failures, thereby increasing communication resource efficiency, reducing power consumption, reducing processing, increasing battery life, and increasing coordination between communication devices.

Aspects of the disclosure are described in the context of wireless communications systems and a network architecture. Aspects of the disclosure are additionally described in the context of a process flow and a configuration diagram. Aspects of the disclosure are further illustrated by and described with reference to apparatus diagrams, system diagrams, and flowcharts that relate to CLI based CSI reporting.

FIG. 1 illustrates an example of a wireless communications system 100 that supports CLI based CSI reporting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) via which the UEs 115 and the network entity 105 may establish one or more communication links 125. The coverage area 110 may be an example of a geographic area via which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1. A UE 115 may communicate with the core network 130 through a communication link 155.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

Consistent with this disclosure, once a specific example is broadened in accordance with this disclosure (e.g., a UE 115 is configured to receive information from a network entity 105 also discloses that a first node is configured to receive information from a second node), the broader example of the narrower example may be interpreted in the reverse, but in a broad open-ended way. In the example above where a UE 115 being configured to receive information from a network entity 105 also discloses that a first node being configured to receive information from a second node, the first node may refer to a first UE 115, a first network entity 105, a first apparatus, a first device, a first computing system, a first one or more components, a first processing entity, or the like configured to receive the information; and the second node may refer to a second UE 115, a second network entity 105, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first node may be described as being configured to transmit information to a second node. In this example and consistent with this disclosure, disclosure that the first node is configured to transmit information to the second node includes disclosure that the first node is configured to provide, send, output, communicate, or transmit information to the second node. Similarly, in this example and consistent with this disclosure, disclosure that the first node is configured to transmit information to the second node includes disclosure that the second node is configured to receive, obtain, or decode the information that is provided, sent, output, communicated, or transmitted by the first node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support CLI based CSI reporting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, in which case $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) via which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5GNR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a CSI-RS), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to increase link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support the communication of CSI between communication devices. For example, communication devices (e.g., network entities 105, UEs 115) may exchange CSI (e.g., a network entity 105 may gather CSI from a UE 115, UEs 115 may exchange CSI) to efficiently configure and schedule the channel. In some examples, this information may be sent from a UE 115 in the form of a CSI report. A CSI report may contain: an RI requesting a quantity of layers (e.g., spatial layers) to be used for transmissions (e.g., based on antenna ports of the UE 115); a layer indicator (LI) indicating a strongest layer of the quantity of layers requested by the RI; a PMI indicating a preference for which precoder matrix should be used (e.g., based on a quantity of layers); a CQI representing a highest order modulation scheme that may be used; a CSI-RS resource indicator (CRI) indicating a preferred beam for communicating with a communication device (e.g., a network entity 105, another UE 115); a synchronization signal block (SSB) resource indicator (SSBRI) indicating an SSB that the UE 115 receives with a highest received power (e.g., reference signal received power (RSRP), or a combination thereof, among other examples of CSI that may be included in a CSI report.

In some cases, an RI may be associated with a quantity of antennas used by a device. CQI may be calculated by a UE 115 in response to receiving predetermined pilot symbols such as CRSs or CSI-RSs. RI and PMI may be excluded if the UE 115 does not support spatial multiplexing (or is not in a supported spatial mode). In some examples, the types of information included in the CSI report may determine a reporting type (e.g., a type I CSI report, a type II CSI report, among other CSI report types). In some examples, a CSI report may be periodic, aperiodic, or semi-persistent.

Based on gathered CSI, a network entity 105 may indicate various parameters for a UE 115 to use in transmitting uplink messages to the network entity 105. For example, a network entity 105 may transmit a TPMI to a UE 115 that indicates a precoding matrix for the UE 115 to use in precoding and transmitting an uplink message to the network entity 105. In some examples, the TPMI may correspond to a PMI reported by the UE 115. In some examples, the TPMI may indicate a different precoding matrix than a precoding matrix indicated by a reported PMI. In some examples, the network entity 105 may indicate the precoding matrix by indicating an index of the TPMI. For example, the UE 115 may be configured with or otherwise store various precoding matrices corresponding to various TPMI indexes. Table 1 below illustrates an example of a set of precoding matrices W with which the UE 115 may be configured or otherwise store, where the precoding matrices are for single-layer transmissions using four antenna ports with transform precoding disabled.

TABLE 1

| TPMI Index | W (ordered from left to right in increasing order of TPMI index) | | | |
|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ |
| | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |
| | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ |
| | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ |

Accordingly, the network entity 105 may indicate a precoding matrix W to the UE 115 by transmitting a TPMI that includes a TPMI index, for example, of a table of TPMI indexes, where each table of TPMI indexes corresponds to transmissions using various combinations of antenna ports and spatial layers.

Additionally or alternatively, the network entity may transmit a transmission rank indicator (TRI) to a UE 115 that indicates a rank according to which the UE 115 is transmit an uplink message to the network entity 105 (e.g., a quantity of spatial layers that the UE 115 is to use). In some examples, the TRI may correspond to an RI reported by the UE 115. In some examples, the TRI may indicate a different quantity of spatial layers than a quantity of spatial layers indicated by a reported RI.

The wireless communications system 100 may support full duplex communications (e.g., a mode that supports two-way communication via concurrent transmission and reception) between communication devices. For example, a network entity 105 may concurrently transmit a downlink message to a first UE 115 and receive an uplink message from a second UE 115. Additionally or alternatively, a network entity 105 and a UE 115 may concurrently communicate a downlink message and an uplink message with each other. Additionally or alternatively, a UE 115 may concurrently receive a downlink message from a first network entity 105 and transmit an uplink message to a second network entity 105. Other examples of full duplex communications between communication devices may be supported.

In some cases, CLI may be associated with full duplex communications. For example, because full duplex communications are communicated concurrently in time, a full duplex downlink message may interfere with a full duplex uplink message, or vice versa. Inter-UE CLI may refer to the CLI caused by an uplink message transmitted by a first UE 115 interfering with a downlink message concurrently received at a second UE 115. Inter-gNB CLI may refer to the CLI caused by a downlink message transmitted by a first base station 140 interfering with an uplink message concurrently received at a second base station 140. CLI may degrade a reliability or signal quality of full duplex communications.

Various aspects of the described techniques support reporting CSI that is based on estimated inter-UE CLI and such aspects may be implemented by wireless communications system 100. For example, UEs 115 may include a communications manager 101 and network entities 105 may include a communications manager 102 that may each support CLI based CSI reporting implementations. The communications manager 101 may be an example of aspects of a communications manager as described in FIGS. 7 through 10. The communications manager 102 may be an example of aspects of a communications manager as described in FIGS. 11 through 14.

By way of example, a network entity 105 (e.g., using a communications manager 102) may indicate, to a first UE and a second UE, transmission parameters for communicating a multi-port CLI-RS. The second UE 115 (e.g., using a respective communications manager 101) may transmit the multi-port CLI-RS to the first UE 115 using two or more transmit antenna ports. The first UE 115 (e.g., using a respective communications manager 101) may receive the multi-port CLI-RS using two or more receive antenna ports and may estimate a CLI channel between the first UE 115 and the second UE 115 based on measurements of the multi-port CLI-RS. Based on the CLI channel and one or more precoding parameters associated with uplink precoding at the second UE 115 (e.g., a candidate precoding matrix for precoding an uplink message at the second UE 115), the first UE 115 may estimate CLI at the first UE 115.

The estimated CLI may impact channel conditions between the first UE 115 and the network entity 105. Accordingly, the first UE 115 may estimate a channel between the first UE 115 and the network entity 105 based on the estimated CLI in addition to a CSI-RS received from the network entity 105 (e.g., rather than considering only the CSI-RS). As such, the first UE 115 may generate and report CSI based on a channel estimate that considers the impact of potential CLI caused by the second UE 115. As a result, communication parameters (e.g., precoding parameters, ranks, beamforming parameters, transmission powers, modulation schemes, time resources, frequency resources, or a combination thereof, among others) may be selected to reduce CLI impact, thereby increasing full duplex communication reliability.

Figure 2:
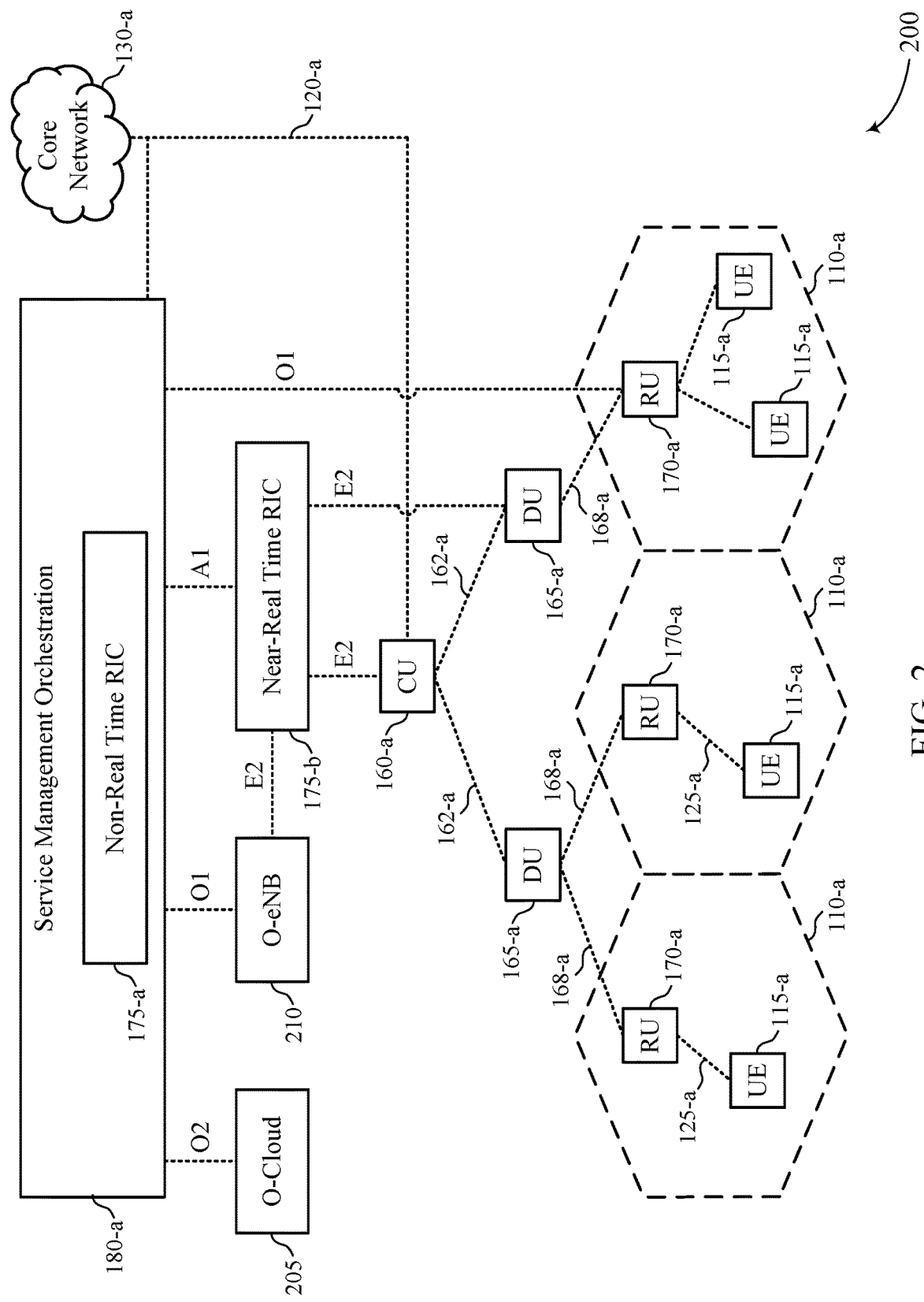
FIG. 2 illustrates an example of a network architecture that supports CLI based CSI reporting in accordance with one or more aspects of the present disclosure.

FIG. 2 illustrates an example of a network architecture 200 (e.g., a disaggregated base station architecture, a disaggregated RAN architecture) that supports CLI based CSI reporting in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals via a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, via a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (e.g., an O1 interface). For virtualized network entities 105, the SMO 180-a may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (e.g., via an O1 interface). Additionally, or alternatively, in some implementations, the SMO 180-a may communicate directly with one or more RUs 170-a via an O1 interface. The SMO 180-a also may include a Non-RT RIC 175-a configured to support functionality of the SMO 180-a.

The Non-RT RIC 175-a may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-b. The Non-RT RIC 175-a may be coupled to or communicate with (e.g., via an A1 interface) the Near-RT RIC 175-b. The Near-RT RIC 175-b may be configured to include a logical function that enables near-real-time control and optimization of RAN elements and resources via data collection and actions via an interface (e.g., via an E2 interface) connecting one or more CUs 160-a, one or more DUs 165-a, or both, as well as an O-eNB 210, with the Near-RT RIC 175-b.

In some examples, to generate AI/ML models to be deployed in the Near-RT RIC 175-b, the Non-RT RIC 175-a may receive parameters or external enrichment information from external servers. Such information may be utilized by the Near-RT RIC 175-b and may be received at the SMO 180-a or the Non-RT RIC 175-a from non-network data sources or from network functions. In some examples, the Non-RT RIC 175-a or the Near-RT RIC 175-b may be configured to tune RAN behavior or performance. For example, the Non-RT RIC 175-a may monitor long-term trends and patterns for performance and employ AI or ML models to perform corrective actions through the SMO 180-*a* (e.g., reconfiguration via O1) or via generation of RAN management policies (e.g., AI policies).

In accordance with examples described herein, a UE 115-*a* may report CSI that is based on inter-UE CLI that is estimated based on a multi-port CLI-RS. For example, a UE 115-*a* may transmit a report (e.g., a CSI report) to an RU 170-*a* that includes CSI that is generated based on estimated CLI between two UEs 115-*a* in accordance with examples as described herein.

Figure 3A:
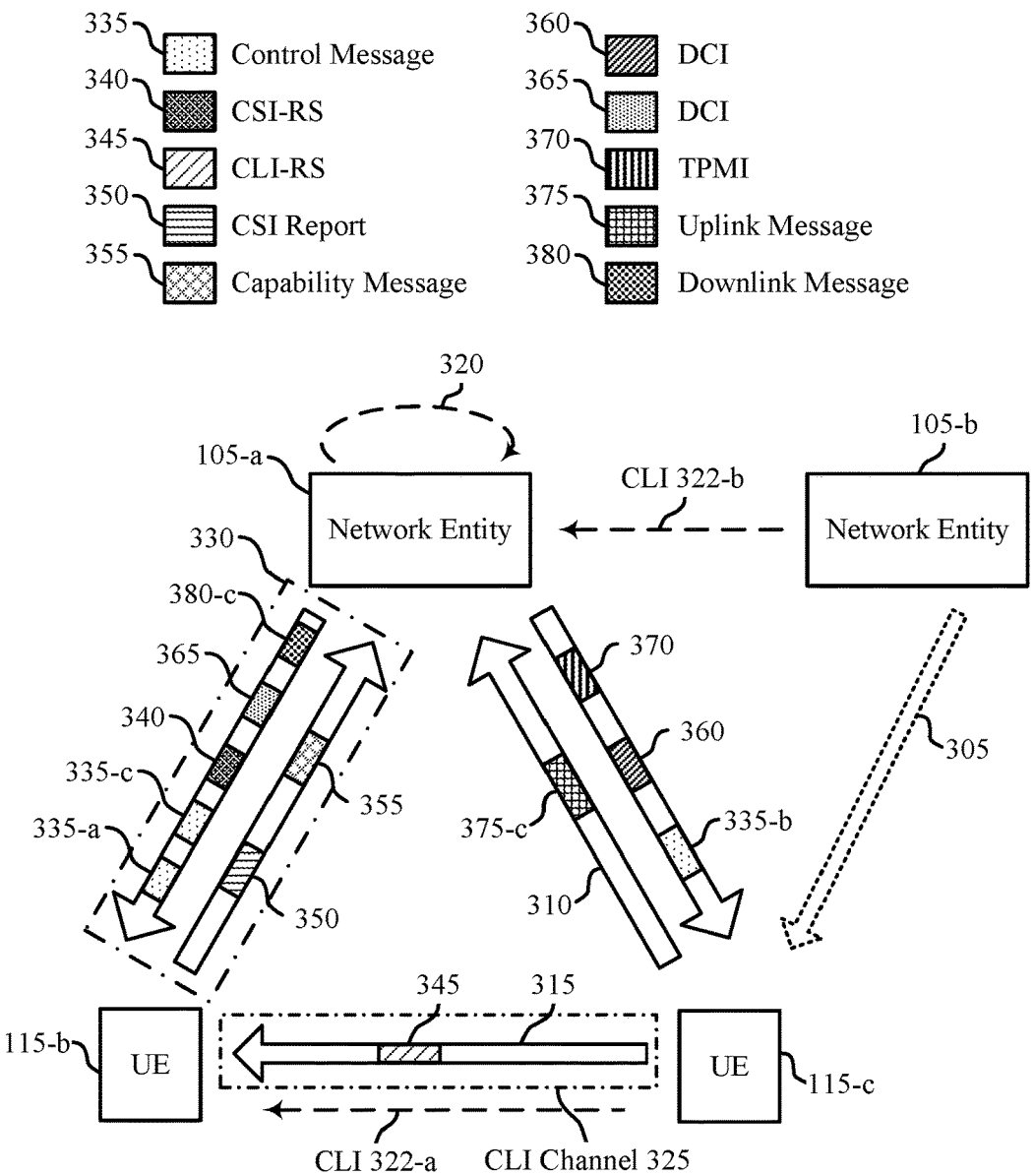
FIGS. 3A and 3B illustrates examples of wireless communications system and a full duplex communication diagram, respectively, that support CLI based CSI reporting in accordance with one or more aspects of the present disclosure.

FIG. 3A illustrates an example of a wireless communications system 300 that supports CLI based CSI reporting in accordance with one or more aspects of the present disclosure. The wireless communications system 300 may implement or be implemented by aspects of wireless communications system 100 as described with reference to FIG. 1. For example, the wireless communications system 300 may include a UE 115-*b*, a UE 115-*c*, a network entity 105-*a*, and a network entity 105-*b*, which may be examples of the corresponding devices described herein, including with reference to FIGS. 1 and 2.

The wireless communications system 300 may support communication between the UEs 115 and the network entity 105. For example, the network entities 105 may transmit downlink messages to the UEs 115 via respective communication links 305, and the UEs 115 may transmit uplink messages to the network entities 105 via respective communications links 310. The communications links 305 and 310 may be examples of a communication link 125 described herein, including with reference to FIG. 1. The wireless communications system 300 may also support communication between the UEs 115, for example, via a communication link 315.

The wireless communications system 300 may also support full duplex communications between various combinations of the UEs 115 and the network entities 105. For example, the network entity 105-*a* may concurrently communicate uplink messages 375 and downlink messages 380 with the UE 115-*b*, the UE 115-*c*, or both. Additionally or alternatively, the UE 115-*c* may concurrently communicate uplink messages 375 and downlink messages 380 with the network entity 105-*a*, the network entity 105-*b*, or both (e.g., in multi-RU communication scenarios). Other examples of full duplex communications may also be supported by the wireless communications system 300.

Figure 3B:
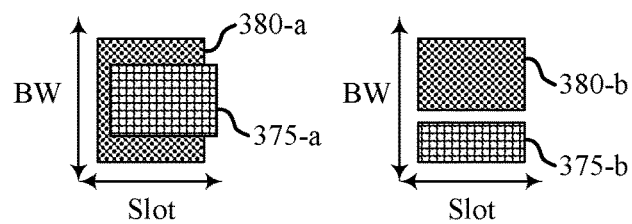

In some examples, full duplex communications may be in-band full duplex communications or subband full duplex communications. For example, FIG. 3B illustrates an example full duplex communication diagram 372. The full duplex communication diagram 372 illustrates an example of in-band full duplex communications and an example subband full duplex communications. For instance, in the example of in-band full duplex communications, an uplink message 375-*a* and a downlink message 380-*a* may be concurrently transmitted via shared time and frequency resources. That is, a time and frequency resource (e.g., a slot and bandwidth) via which the uplink message 375-*a* is communicated may overlap (e.g., full or partial overlap) with a time and frequency resource (e.g., a slot and bandwidth) via which the downlink message 380-*a* is communicated. In the example of subband full duplex communications, an uplink message 375-*b* and a downlink message 380-*b* may be concurrently transmitted via shared time resources but different frequency resources. That is, the uplink message 375-*b* and the downlink message 380-*b* may be communicated via overlapping time resources (e.g., fully overlapping, such as via a same slot, or partially overlapping). However, the uplink message 375-*b* and the downlink message 380-*b* may be communicated via non-overlapping frequency resources (e.g., via different subbands of a bandwidth). In some examples, a guard band may separate the frequency resources of the uplink message 375-*b* and the downlink message 380-*b* in the frequency domain.

Returning to FIG. 3A, full duplex communications may be associated with self-interference 320, CLI 322, or both. For example, self-interference 320 at a communication device may result from the concurrent communication of uplink messages 375 and downlink messages 380. For instance, in the example of FIGS. 3A and 3B, an uplink message 375 that is received at the network entity 105-*a* may interfere with a downlink message 380 that is transmitted by the network entity 105-*a* concurrent with reception of the uplink message 375, or vice versa. Such interference may be referred to as self-interference 320. UEs 115 operating in a full duplex mode may similarly experience self-interference 320. CLI 322 may result from concurrent communication of uplink messages 375 and downlink messages 380 between different communication devices. For example, in the example of FIG. 3, an uplink message 375 transmitted by the UE 115-*c* may interfere with a downlink message 380 that is concurrently received at the UE 115-*b*, thereby causing CLI 322-*a*. In the example of FIG. 3, a downlink message 380 transmitted by the network entity 105-*b* may interfere with an uplink message 375 that is concurrently received at the network entity 105-*a*, thereby causing CLI 322-*b*. Other examples of CLI 322 between communication devices are also possible.

In some examples, inter-UE CLI (e.g., the CLI 322-*a*) may be intra-cell CLI or inter-cell CLI. For example, if the UE 115-*b* and the UE 115-*c* are in a same cell, the CLI 322-*a* would constitute intra-cell CLI (e.g., CLI from UEs 115 in the same cell). Alternatively, if the UE 115-*b* and the UE 115-*c* are in different cells (e.g., adjacent cells), the CLI 322-*a* would constitute inter-cell CLI (e.g., CLI from UEs 115 in different cells). CLI 322 may degrade a signal quality of full duplex communications, for example, by adding additional noise to a channel between communication devices, thereby reducing a reliability of full duplex communications.

To reduce CLI 322 impact on full duplex communications, a UE 115 may report CSI that considers the impact of CLI. For example, the network entity 105-*a* may transmit one or more control messages 335 (e.g., via RRC signaling) that indicate one or more transmission parameters of a CLI-RS 345. For example, the network entity 105-*a* may transmit a control message 335-*a* to the UE 115-*b* that indicates the one or more transmission parameters and transmit a control message 335-*b* to the UE 115-*c* that indicates the one or more transmission parameters. In some examples, the one or more transmission parameters of the CLI-RS 345 may include a resource via which the UE 115-*c* and the UE 115-*b* may communicate the CLI-RS 345, a quantity of antenna ports to use to communicate the CLI-RS 345, or a combination thereof. In some examples, the control message 335-*a* may include a reporting configuration for the UE 115-*b* to transmit a CSI report 350 that includes CLI based CSI associated with a channel 330 between the UE 115-*b* and the network entity 105-*a*, and the one or more transmission parameters may be included in the reporting configuration.

The CLI-RS 345 may be a multi-port CLI-RS 345 that supports the estimation of a CLI channel 325 between the UE 115-*b* and the UE 115-*c*. For example, the UE 115-*c* may transmit the CLI-RS 345 to the UE 115-b using two or more antenna ports, and the UE 115-b may receive the CLI-RS 345 using two or more antenna ports. Based on measurements of the CLI-RS 345, the UE 115-b may estimate (e.g., compute) a CLI channel matrix $H_{CLI}$ of the CLI channel 325.

In some examples, the communication of the CLI-RS 345 may be based on whether the UE 115-b is capable of estimating the CLI channel 325 based on the CLI-RS 345. For example, the UE 115-b may transmit a capability message 355 to the network entity 105-a that indicates a capability of the UE 115-b to estimate the CLI channel 325 based on a CLI-RS 345. The network entity 105-a may configure the transmission parameters for the CLI-RS 345 (e.g., via the control messages 335-a and 335-b) in response to the capability message 355 indicating that the UE 115-b is capable of estimating the CLI channel 325 based on the CLI-RS 345.

In some examples, the network entity 105-a may transmit a control message, such as DCI 360, to the UE 115-c to trigger the transmission of the CLI-RS 345, for example, if the resource is an aperiodic resource or a semi-persistent scheduling (SPS) resource. In some examples, the resource may be a periodic resource, and the UE 115-c may transmit the CLI-RS 345 in accordance with a periodicity of the second resource and without reception of (e.g., triggering by) the DCI 360.

The network entity 105-a may transmit a CSI-RS 340 to the UE 115-b that is associated with generating the CLI based CSI. For example, the UE 115-b may receive and measure the CSI-RS 340 and may estimate the channel 330 (e.g., compute and estimate a channel matrix H of the channel 330) based on measurements of the CSI-RS 340. The CSI-RS 340 may be a multi-port CSI-RS. For example, the network entity 105-a may transmit the CSI-RS 340 using multiple antenna ports (e.g., 4, 8, 16, 32 antenna ports, among other quantities of antenna ports), and the UE 115-a may receive the CSI-RS 340 using multiple antenna ports. The UE 115-b may use the estimate of the channel 330 in generating the CLI based CSI.

In some examples, network entity 105-a may indicate, to the UE 115-b one or more precoding parameters associated with uplink precoding at the UE 115-c, which the UE 115-b may use to estimate the CLI 322-a at the UE 115-b. For example, the control message 335-a (e.g., the reporting configuration for the CSI report 350), or a control message 335-c transmitted by the network entity 105-a, may indicate one or more precoding matrices that are candidates for precoding an uplink message 375 (e.g., an uplink message 375-c) at the UE 115-c. For instance, the control message 335-a or the control message 335-c may include one or more TPMIs or TRIs that indicate the one or more candidate precoding matrices. The uplink message 375-c may correspond to a prospective (e.g., future) uplink message 375 that may (e.g., or may not) be subsequently scheduled to be transmitted by the UE 115-c concurrent with reception of a downlink message 380-c (e.g., a prospective downlink message 380) at the UE 115-b. Accordingly, if subsequently communicated, the uplink message 375-c may cause CLI 322-a at the UE 115-b, thus decreasing a reliability of the downlink message 380-c.

Uplink precoding of the uplink message 375-c may affect the CLI 322-a (e.g., a level or strength of CLI caused by the uplink message 375-c). For example, precoding the uplink message 375-c using different precoding matrices may result in transmitting the uplink message 375-c using different beam patterns and beam directions. Based on the location of the UE 115-b relative to the location of the UE 115-c, different beam patterns and beam directions for the uplink message 375-c may correspond to different strengths of the CLI 322-a.

The UE 115-b may estimate the CLI 322-a based on the one or more candidate precoding matrices for the uplink message 375-c and the CLI channel 325. For example, a downlink signal that is received at the UE 115-b from the network entity 105-a concurrent with transmission of an uplink signal by the UE 115-c may be computed according to Equation 1 below:

$$y = HPx + H_{CLI}Tz + n \qquad (1)$$

In Equation 1, y is the received downlink signal, H is the channel matrix corresponding to the channel 330, P is a downlink precoding matrix (e.g., a precoding matrix indicated by a PMI) used by the network entity 105-a, x is the desired downlink signal, $H_{CLI}$ is the channel matrix corresponding to the CLI channel 325, T is an uplink precoding matrix (e.g., a precoding matrix indicated by a TPMI) used by the UE 115-c, z is the uplink signal, and n is noise. CLI 322-a observed at the UE 115-b may be based on the effective CLI channel $H_{CLI}T$, a transmission power of the uplink signal, a rank of the uplink signal, or a combination thereof. Accordingly, based on estimating the CLI channel 325 using the CLI-RS 345 and being indicated a candidate precoding matrix for the uplink message 375-c, the UE 115-b may estimate the CLI 322-a and consider the impact of the CLI 322-a in generating CSI to report to the network entity 105-a. The UE 115-b may also estimate the impact that different candidate precoding matrices for the uplink message 375-c have on the CLI 322-a and generate CSI based on CLI 322-a estimated using one or more candidate precoding matrices.

For example, the UE 115-b may transmit the CSI report 350 to network entity 105-a in response to the CSI-RS 340 that includes CSI generated based on measurements of the CSI-RS 340, measurements of the CLI-RS 345, and one or more candidate precoding matrices (e.g., the CSI-RS 340 and estimated CLI 322-a). In an example of selecting a PMI for inclusion in the CSI report 350, the UE 115-b may estimate the channel 330 (e.g., the channel matrix H) based on the CSI-RS 340 and may estimate, based on the effective CLI channel $H_{CLI}T$, a linear transformation W used to uncorrelate the channel 330 via receive antenna ports of the UE 115-b (e.g., a whitening matrix, a sphering transformation). The UE 115-b may consider a candidate PMI P for selection and may compute a covariance matrix of the equivalent channel 330 $\tilde{H}$, where $\tilde{H}$=WHP. The UE 115-b may compute the spectral efficiency based on the covariance matrix of the equivalent channel $\tilde{H}$. The UE 115-b may compute the spectral efficiency corresponding to multiple candidate PMIs and may select a PMI for inclusion in the CSI report 350 that maximizes spectral efficiency. The UE 115-b may similarly select other types of CSI (e.g., RI, CQI, etc.) for inclusion in the CSI report 350. Thus, the UE 115-b may generate the CSI for inclusion in the CSI report 350 based on the CSI-RS 340 and the estimated CLI 322-a. Additional details related to the generation of CSI based on CLI 322 are described with reference to FIG. 5 below.

In some examples, the network entity 105-a may transmit a control message, such as the DCI 365, to the UE 115-b to trigger the communication of the CSI-RS 340 and the CSI report 350, for example, if the first resource is an aperiodic resource or SPS resource. In some examples, the CSI-RS 340 and the CSI report 350 may be communicated via periodic resources, and the UE 115-c may receive the CSI-RS 340 and transmit the CSI report 350 in accordance with a periodicity of the periodic resources and without reception of (e.g., triggering by) the DCI 365.

The network entity 105-*a* may manage full duplex communications with the UE 115-*b* and the UE 115-*c* based on the reported CLI based CSI. For example, the network entity 105-*a* may transmit the downlink message 380-*c* in accordance with the CLI based CSI, for example, using a precoding matrix indicated by a PMI included in the CSI report 350. Because the PMI was selected by the UE 115-*b* considering the impact of CLI 322, a reliability of the downlink message 380-*c* may be increased, for example, relative to if the downlink message 380-*c* were precoded in accordance with a PMI selected by the UE 115-*b* without considering the impact of CLI 322.

Additionally or alternatively, the network entity 105-*a* may select a precoding matrix for the UE 115-*c* to use in precoding the uplink message 375-*c* based on the CLI based CSI. For example, the network entity 105-*a* may select the precoding matrix for precoding of the uplink message 375-*c* such that the CLI 322-*a* may be reduced. Additionally or alternatively, the network entity 105-*a* may transmit a TPMI 370 to the UE 115-*c* that indicates the selected precoding matrix, and the UE 115-*c* may transmit the uplink message 375-*c* in accordance with the TPMI 370. Alternatively, the network entity 105-*a* may determine to schedule the downlink message 380-*c* and the uplink message 375-*c* to be non-overlapping in time so that the CLI 322-*a* may not affect reception of the downlink message 380-*c*. Thus, by managing full duplex communications based on CLI based CSI, full duplex communication reliability may be increased.

Figure 4:
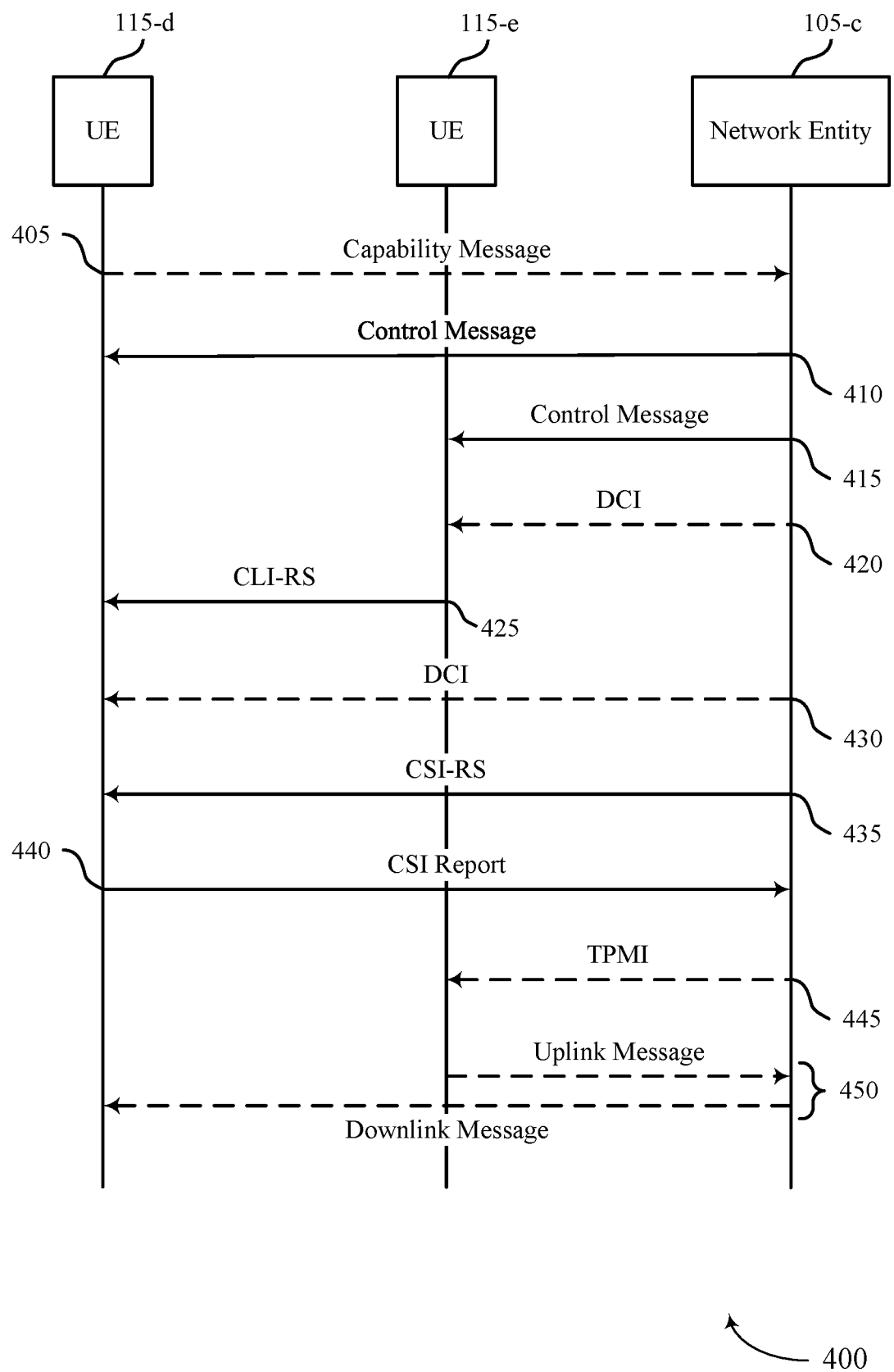
FIG. 4 illustrates an example of a process flow that supports CLI based CSI reporting in accordance with one or more aspects of the present disclosure.

FIG. 4 illustrates an example of a process flow 400 that supports CLI based CSI reporting in accordance with one or more aspects of the present disclosure. The process flow 400 may be implemented by aspects of the wireless communications systems 100 or 300. For example, the process flow 400 may illustrate communication between a UE 115-*d*, a UE 115-*e*, and a network entity 105-*c*, which may be examples of corresponding devices described herein, including with reference to FIGS. 1 through 3.

In the following description of the process flow 400, the operations may be performed in a different order than the order shown. Specific operations also may be left out of the process flow 400, or other operations may be added to the process flow 400. Further, although some operations or signaling may be shown to occur at different times for discussion purposes, these operations may actually occur at the same time.

At 405, the UE 115-*d* may transmit a capability message to the network entity 105-*c*, which may be an example of a capability message 355 described with reference to FIG. 2. For example, the capability message may indicate a capability of the UE 115-*d* to estimate a CLI channel between the UE 115-*d* and the UE 115-*e* based on a CLI-RS transmitted by the UE 115-*e*.

At 410, the network entity 105-*c* may transmit a first control message (e.g., via RRC signaling) to the UE 115-*d*. In some examples, the first control message (e.g., or another control message) may indicate a first resource for communication of a CSI-RS associated with estimation of a channel between the UE 115-*d* and the network entity 105-*c* (e.g., as part of a CSI reporting configuration to report CLI based CSI). In some examples, the first control message (e.g., or another control message) may indicate transmission parameters of a multi-port CLI-RS associated with estimation of a CLI channel between the UE 115-*d* and the UE 115-*e*, such as a second resource for reception of the multi-port CLI-RS, a quantity of two or more antenna ports for receiving the multi-port CLI-RS (e.g., corresponding to a quantity of transmit antenna ports of the UE 115-*e*), an indication to generate CLI based CSI, or a combination thereof. In some examples, the first control message (e.g., or another control message) may indicate one or more candidate precoding matrices (e.g., TPMIs) associated with uplink precoding at the UE 115-*e*.

At 415, the network entity 105-*c* may transmit a second control message (e.g., included in RRC signaling) to the UE 115-*e*. The second control message may indicate transmission parameters of the multi-port CLI-RS to the UE 115-*e*, such as the second resource for transmission of the multi-port CLI-RS by the UE 115-*e*, a quantity of antenna ports for transmitting the multi-port CLI-RS, or a combination thereof.

At 420, the network entity 105-*c* may transmit first DCI to the UE 115-*e* that triggers transmission of the multi-port CLI-RS. For example, if the second resource is an aperiodic resource, the first DCI may schedule the aperiodic resource such that the UE 115-*e* may transmit the CLI-RS via the aperiodic resource. If the second resource is an SPS resource, the first DCI may activate the SPS resource such that the UE 115-*e* may transmit the multi-port CLI-RS via the SPS resource. In some examples, the network entity 105-*c* may transmit the first DCI to the UE 115-*d* to trigger reception of the multi-port CLI-RS.

At 425, the UE 115-*e* may transmit the multi-port CLI-RS to the UE 115-*d* via the second resource. The UE 115-*d* may measure the multi-port CLI-RS and estimate the CLI channel (e.g., a CLI channel matrix $H_{CLI}$) between the UE 115-*d* and the UE 115-*e* based on measurements of the multi-port CLI-RS. In some examples, if the second resource is a periodic resource, the UE 115-*e* and the UE 115-*d* may communicate the multi-port CLI-RS via the periodic resource without communication of the first DCI.

At 430, the network entity 105-*c* may transmit second DCI to the UE 115-*d* that triggers communication of a CSI report that includes CSI based on estimated CLI between the UE 115-*d* and the UE 115-*e*. For example, if the CSI report is an aperiodic CSI report or an SPS CSI report, the second DCI may schedule or activate the first resource for communication of the multi-port CSI-RS, aperiodic or SPS resources for communication of the CSI report, or a combination thereof. In some examples, the second DCI may indicate the one or more candidate precoding matrices (e.g., in addition to or instead of triggering communication of the CSI report).

At 435, the network entity 105-*c* may transmit the CSI-RS to the UE 115-*d* via the first resource. The UE 115-*d* may measure the CSI-RS and estimate the channel (e.g., a channel matrix H) between the UE 115-*d* and the network entity 105-*c* based on measurements of the CSI-RS.

At 440, the UE 115-*d* may transmit the CSI report including CLI based CSI to the network entity 105-*c*. For example, the UE 115-*d* may generate the CSI based on the estimated channel (e.g., measurements of the CSI-RS), the estimated CLI channel (e.g., measurements of the multi-port CLI-RS), and one or more of the candidate precoding matrices and may transmit the CSI report including the generated CSI to the network entity 105-*c* (e.g., in accordance with the reporting configuration).

At 445, the network entity 105-*c* may transmit a TPMI to the UE 115-*e* that indicates a precoding matrix for precoding a full duplex uplink message. The network entity 105-*c* may select the TPMI based on the CSI report. For example, based on the CSI report, the network entity 105-*c* may select the TPMI such that CLI at the UE 115-*d* that is caused by transmission of the full duplex uplink message may be reduced.

At 450, the full duplex uplink message and a full duplex downlink message may be communicated. For example, the UE 115-*e* may transmit the full duplex uplink message to the network entity 105-*c*, and the network entity 105-*c* may concurrently transmit the full duplex downlink message to the UE 115-*d*. In some examples, the network entity 105-*c* may transmit the full duplex downlink message to the UE 115-*d* using communication parameters (e.g., a transmission power, a precoding matrix, beamforming weights, a modulation scheme, a coding rate, and the like) based on the CLI based CSI such that an impact of the CLI at the UE 115-*d* may be reduced and a reliability of the full duplex downlink message may be increased.

Figure 5:
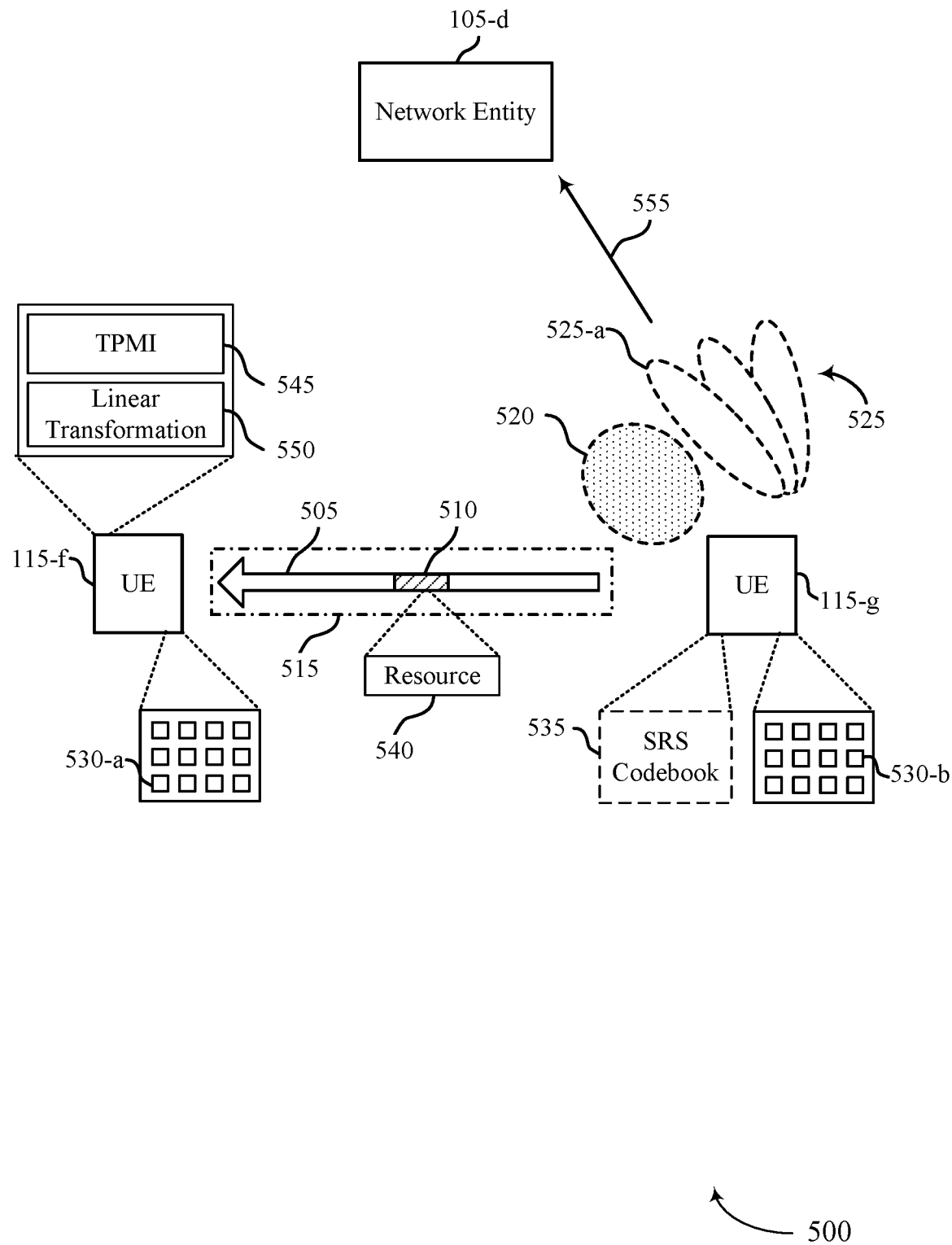
FIG. 5 illustrates an example of a wireless communications system that supports CLI based CSI reporting in accordance with one or more aspects of the present disclosure.

FIG. 5 illustrates an example of a wireless communications system 500 that supports CLI based CSI reporting in accordance with one or more aspects of the present disclosure. The wireless communications system 500 may implement or be implemented by aspects of wireless communications systems 100 and 300 as described with reference to FIGS. 1 and 3, respectively. For example, the wireless communications system 300 may include a UE 115-*f*, a UE 115-*g*, and a network entity 105-*d*, which may be examples of the corresponding devices described herein, including with reference to FIGS. 1 through 4.

The wireless communications system 500 may support communication between the UEs 115 and the network entity 105. The wireless communications system 500 may also support communication between the UEs 115, for example, via a communication link 505.

The wireless communications system 500 illustrates the communication of a multi-port CLI-RS and estimation of CLI based on the multi-port CLI-RS in accordance with examples described herein. For example, the network entity 105-*d* may indicate transmission parameters to the UE 115-*f* and the UE 115-*g* (e.g., via respective control messages 335) to support the communication of a CLI-RS 510 such that the UE 115-*f* may estimate a CLI channel 515 between the UE 115-*f* and the UE 115-*g*. For example, the transmission parameters may indicate a resource 540 via which the UE 115-*g* is to transmit the CLI-RS 510. In some examples, the resource 540 may be a periodic resource, an aperiodic resource, or an SPS resource.

The UE 115-*g* and the UE 115-*f* may communicate the CLI-RS 510 using a quantity of two or more antenna ports 530. For example, the UE 115-*f* may have an antenna array with a quantity of rows and columns of antenna ports 530-*a* that the UE 115-*f* may use to support beamforming of communications with the UE 115-*g*, the network entity 105-*d*, or both. Additionally, the UE 115-*g* may have an antenna array with a quantity of rows and columns of antenna ports 530-*b* that the UE 115-*g* may use to support beamforming of communications with the UE 115-*f*, the network entity 105-*d*, or both. In some examples, different spatial layers may be associated with different antenna ports 530 used for channel measurement and reporting.

The UE 115-*g* may transmit the CLI-RS 510 using a quantity of two or more transmit antenna ports 530-*b*, and the UE 115-*f* may receive the CLI-RS 510 using a quantity of two or more receive antenna ports 530-*a*. The quantity of two or more receive antenna ports 530-*a* may be the same as the quantity of transmit antenna ports 530-*b*. In some examples, the transmission parameters may indicate the quantity of transmit and receive antenna ports 530 that the UE 115-*g* and the UE 115-*f* are to use to communicate the CLI-RS 510, respectively. In some examples, the UE 115-*g* may use the total quantity of transmit antenna ports 530-*b* with which the UE 115-*g* is equipped to transmit the CLI-RS 510. In some examples, the transmission parameters may indicate to the UE 115-*f* the total quantity of transmit antenna ports 530-*b* at the UE 115-*g*, which may indicate the quantity of receive antenna ports 530-*a* that the UE 115-*f* is to use.

In some examples, the CLI-RS 510 may be an SRS. An SRS may be an uplink reference signal that is transmitted by a UE 115 to a network entity 105 that gives information about the effect of multipath fading, scattering, Doppler effects, power loss of a transmitted signal, or a combination thereof. In some examples, the UE 115-*g* may transmit, to the network entity 105-*d* via a communication link 555, an SRS using one or more SRS codebooks 535. For example, the UE 115-*g* may transmit an SRS using one or more beams 525 (e.g., a beam 525-*a*), where the SRS codebook 535 may include parameters for beamforming the SRS using a given beam 525. In some examples, the transmission parameters for the CLI-RS 510 indicated to the UE 115-*g* may indicate an SRS codebook 535 that the UE 115-*g* is to use to transmit the CLI-RS 510. In the example of FIG. 5, the SRS codebook 535 may be associated with the beam 525-*a*. Accordingly, in accordance with the SRS codebook 535, the UE 115-*g* may transmit the CLI-RS 510 using the beam 525-*a*.

In some other examples, the CLI-RS 510 may be a dedicated SRS for CLI estimation, which may be referred to as a CLI-SRS, a multi-port CLI-SRS, or a multi-port SRS. The CLI-SRS may be associated with a wide angle beam, such as a beam 520. For example, the beam 520 may have a first beam width that is greater than a second beam width of a beam 525 (e.g., the beam 525-*a*). In some examples, using the beam 520 to transmit the CLI-RS 510 may improve estimation of the CLI channel 515 with respect to using the beam 525-*a* to transmit the CLI-RS 510. For example, a signal strength and quality of the CLI-RS 510 may be based on a location of the UE 115-*f* relative to the UE 115-*g* and a direction of a beam used to transmit the CLI-RS 510. For instance, as a direction of the beam deviates from the UE 115-*f*, the signal strength and quality of the CLI-RS 510 received at the UE 115-*f* may decrease, which may reduce an accuracy of the measurements of the CLI-RS 510 taken by the UE 115-*f* in computing a channel matrix $H_{CLI}$ of the CLI channel 515. A beam 525 may be relatively more directional than the beam 520, for example, due to having a narrower beam width. Additionally, the relative location of the UE 115-*f* to the UE 115-*g* may be unknown to the network entity 105-*d* when the network entity 105-*d* indicates an SRS codebook to the UE 115-*g* for transmitting the CLI-RS 510. Accordingly, by transmitting a dedicated CLI-SRS using the wide angle beam 520, there may be an increased likelihood that the UE 115-*f* receives the CLI-SRS at a higher signal quality and strength relative to using a beam 525, for example, due to being located within an angle of the beam 520.

The UE 115-*f* may estimate (e.g., predict) CLI at the UE 115-*f* for use in generating CSI based on a TPMI 545 and a linear transformation 550. For example, the UE 115-*f* may be indicated a TPMI 545 indicating a precoding matrix T that is a candidate for use by the UE 115-*g* in precoding and transmitting a full duplex uplink message. As described with reference to FIG. 3, the UE 115-*f* may estimate the CLI channel matrix $H_{CLI}$ of the CLI channel 515 based on measurements of the CLI-RS 510. The UE 115-*f* may calculate an effective CLI channel matrix $\tilde{H}_{CLI}$ based on the precoding matrix T, where $\tilde{H}_{CLI}=H_{CLI}T$. Using the effective CLI channel matrix $\tilde{H}_{CLI}$, the UE 115-$f$ may quantify the impact of CLI for use in generating and selecting CSI to report.

For example, the UE 115-$f$ may estimate (e.g., compute) the linear transformation 550 based on the effective CLI channel matrix $\tilde{H}_{CLI}$. The linear transformation 550 may be a linear transformation used to uncorrelate the channel 330 via receive antenna ports 530-$a$ of the UE 115-$f$, such as a whitening matrix (e.g., whitening transformation) or a sphering transformation, among linear transformations. To compute the linear transformation 550 such that CLI is considered, the UE 115-$f$ may compute the linear transformation 550 using the effective CLI channel matrix $\tilde{H}_{CLI}$. For example, the UE 115-$f$ may compute the linear transformation 550 according to Equation 2 below:

$$W_1=(R_{nn}+\tilde{H}_{CLI}\tilde{H}^*_{CLI})^{-1/2} \qquad (2)$$

In Equation 2, $W_1$ is the computed linear transformation 550 and $R_{nn}$ is a covariance matrix of noise of a channel between the UE 115-$f$ and the network entity 105-$d$. Based on the linear transformation 550, the UE 115-$f$ may estimate the channel between the UE 115-$f$ and the network entity 105-$d$. For example, the UE 115-$f$ may estimate a channel matrix H of the channel based on measurements of a CSI-RS. The UE 115-$f$ may consider a candidate PMI P (e.g., among other CSI that may be considered, such as a candidate RI, a candidate CQI, etc.) for selection and may compute a covariance matrix of an equivalent channel matrix H of the channel, where $\widetilde{H_1}=W_1HP$. The UE 115-$b$ may compute the spectral efficiency based on the covariance matrix of the equivalent channel $\widetilde{H_1}$. The UE 115-$b$ may compute the spectral efficiency corresponding to multiple candidate PMIs and may select a PMI for inclusion in a CSI report that maximizes spectral efficiency.

Alternatively, the UE 115-$f$ may use a minimum mean-squared error interference rejection combining (MMSE-IRC) approach to compute the linear transformation 550 according to Equation 3 below:

$$W = \tilde{H}^*\left(\frac{1}{SINR}\tilde{R}_{nn} + \tilde{H}\tilde{H}^*\right)^{-1/2} \qquad (3)$$

In Equation 3: W is the computed linear transformation 550; $\tilde{H}=HP$, where H is the estimated channel matrix of the channel and P is a PMI; and $\widetilde{R_{nn}}=R_{nn}+\tilde{H}_{CLI}\tilde{H}^*_{CLI}$, where $R_{nn}$ is the covariance matrix of the noise of the channel. The UE 115-$f$ may compute a covariance matrix of an equivalent channel matrix $\widetilde{H_2}$ of the channel, where $\widetilde{H_2}=W_2HP$. The UE 115-$b$ may compute the spectral efficiency based on the covariance matrix of the equivalent channel $\widetilde{H_2}$. The UE 115-$b$ may compute the spectral efficiency corresponding to multiple candidate PMIs and may select a PMI for inclusion in a CSI report that maximizes spectral efficiency.

Figure 6:
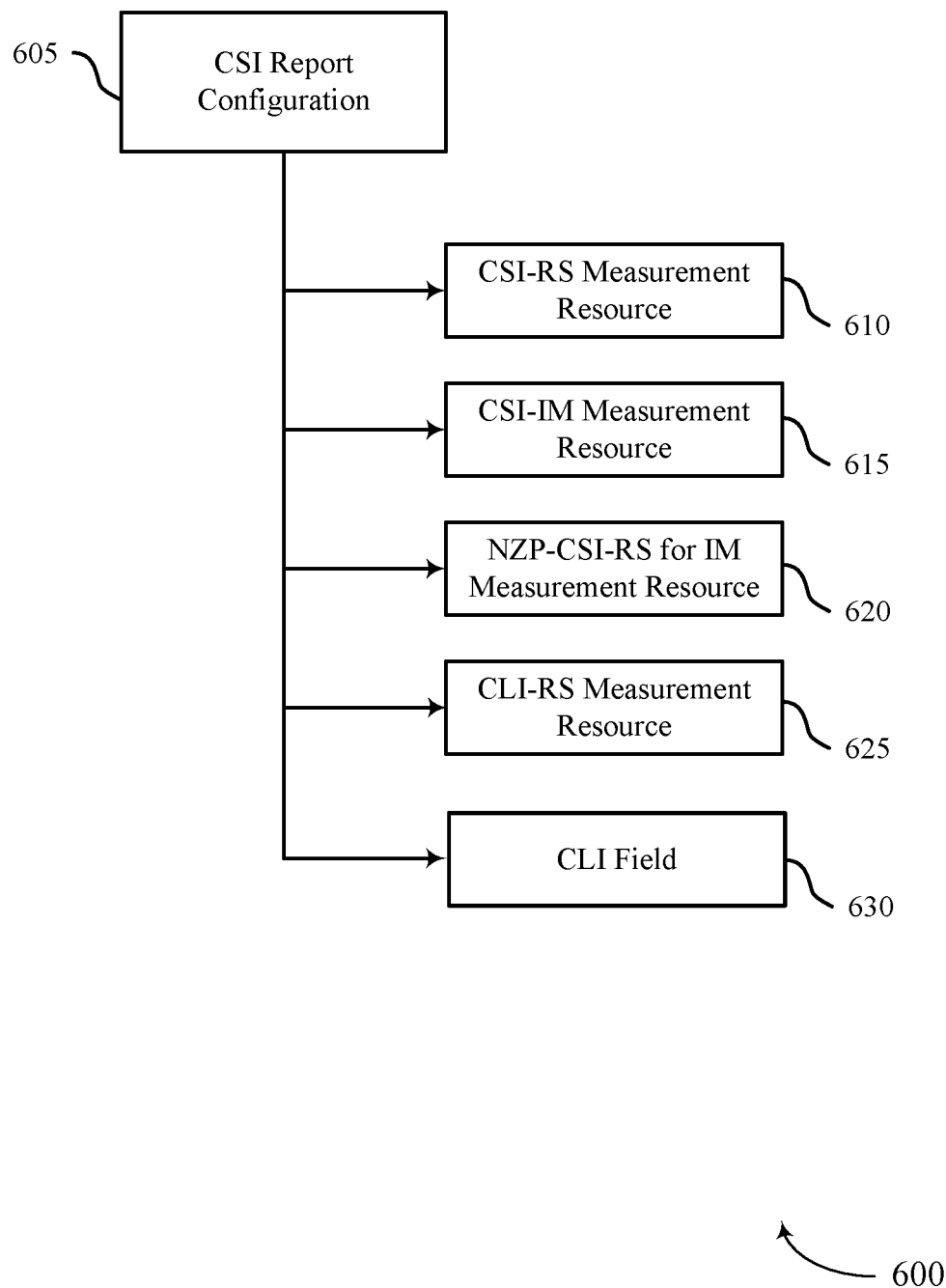
FIG. 6 illustrates an example of a configuration diagram that supports CLI based CSI reporting in accordance with one or more aspects of the present disclosure.

FIG. 6 illustrates an example of a configuration diagram 600 that supports CLI based CSI reporting in accordance with one or more aspects of the present disclosure. The configuration diagram 600 may be implemented by aspects of wireless communications systems 100, 300, or 500 as described with reference to FIGS. 1, 3, and 5, respectively. For example, the configuration diagram 600 may be implemented by a UE 115 and a network entity 105 to support CLI based CSI generation and reporting.

The configuration diagram 600 illustrates a CSI report configuration 605, which may be an example of a reporting configuration indicated via a control message 335 as described with reference to FIG. 3. In some examples, a network entity 105 may transmit the CSI report configuration 605 to a UE 115 via RRC signaling.

The CSI report configuration 605 may include various parameters associated with generating and reporting CLI based CSI. For example, the CSI report configuration 605 may include an indication of a CSI-RS measurement resource 610, which may be a first measurement resource via which a network entity 105 may transmit a CSI-RS (e.g., a CSI-RS 340) to a first UE 115. The first UE 115 may receive and measure the CSI-RS via the first measurement resource to estimate a channel between the first UE 115 and the network entity 105. In some examples, the CSI report configuration 605 may include an indication of a CSI-interference measurement (CSI-IM) resource 615, and indication of a non-zero-power-CSI-RS (NZP-CSI-RS) for IM measurement resource 620, or a combination thereof.

The CSI report configuration 605 may also transmission parameters for a CLI-RS associated with estimation of a CLI channel between the first UE 115 and a second UE 115. For example, the CSI report configuration 605 may include an indication of a CLI-RS measurement resource 625, which may be a second measurement resource via which the first UE 115 may receive the CLI-RS from a second UE 115. The first UE 115 may receive and measure the CLI-RS to estimate the CLI channel between the first UE 115 and the second UE 115 and may generate CSI based on the estimated CLI channel (e.g., based on CLI estimated using the CLI channel estimate and a candidate precoding matrix).

In some examples, the CSI report configuration 605 may implicitly indicate for the first UE 115 to generate CSI based on estimated CLI. For example, including the indication of the CLI-RS measurement resource 625 in the CSI report configuration 605 may be an implicit indication to the first UE 115 to generate CSI based on a CLI channel that is estimated based on a CLI-RS transmitted via the CLI-RS measurement resource 625. That is, the UE 115 may generate CLI based CSI in response to the CSI report configuration 605 including the CLI-RS measurement resource 625.

In some examples, the CSI report configuration 605 may explicitly indicate for the first UE 115 to generate CSI based on estimated CLI. For example, the CSI report configuration 605 may include a CLI field 630. In some examples, the CLI field 630 may be a report quantity for CLI based CSI, such as an "eCSF_cri-RI-PMI-CQI" field that indicates for the first UE 115 to generate and transmit CLI based RI, CLI based PMI, CLI based CQI, or a combination thereof. In some other examples, the CLI field 630 may be an additional field in the CSI report configuration 605 that indicates whether a CSI report transmitted in accordance with the CSI report configuration 605 includes CLI based CSI or non-CLI based CSI (e.g., CLI based CSI=configured/not configured).

Thus, the CSI report configuration 605 may support the generation and reporting of CSI that is based on estimated CLI.

Figure 7:
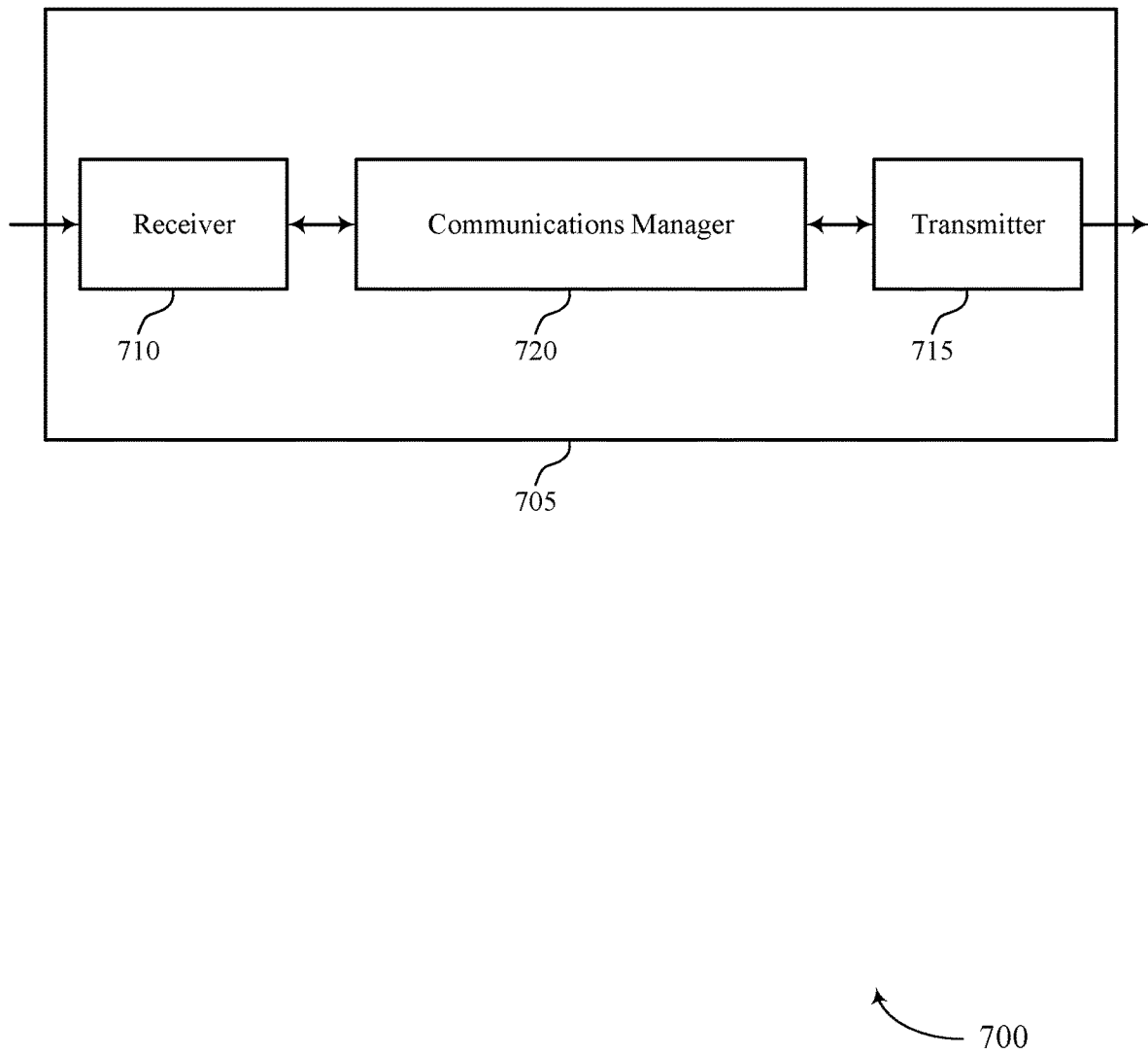
FIGS. 7 and 8 show block diagrams of devices that support CLI based CSI reporting in accordance with one or more aspects of the present disclosure.

FIG. 7 shows a block diagram 700 of a device 705 that supports CLI based CSI reporting in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to CLI based CSI reporting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to CLI based CSI reporting). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of CLI based CSI reporting as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE in accordance with examples as disclosed herein. For example, the communications manager 720 may be configured as or otherwise support a means for obtaining one or more control messages indicating one or more transmission parameters of a multi-port reference signal associated with estimation of a CLI channel between the first UE and a second UE and indicating one or more precoding parameters associated with uplink precoding at the second UE, where the one or more transmission parameters of the multi-port reference signal indicate a quantity of two or more antenna ports for communicating the multi-port reference signal. The communications manager 720 may be configured as or otherwise support a means for obtaining, using the quantity of two or more antenna ports, the multi-port reference signal associated with estimation of the CLI channel between the first UE and the second UE based on the one or more transmission parameters. The communications manager 720 may be configured as or otherwise support a means for obtaining a CSI-RS associated with estimation of a channel between the first UE and a network entity. The communications manager 720 may be configured as or otherwise support a means for outputting a report including CSI that is based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

Additionally, or alternatively, the communications manager 720 may support wireless communication at a second UE in accordance with examples as disclosed herein. For example, the communications manager 720 may be configured as or otherwise support a means for obtaining a control message indicating one or more transmission parameters of a multi-port reference signal associated with estimation of a CLI channel between the second UE and a first UE, where the one or more transmission parameters of the multi-port reference signal indicate a quantity of two or more antenna ports for communicating the multi-port reference signal. The communications manager 720 may be configured as or otherwise support a means for outputting, using the quantity of two or more antenna ports, the multi-port reference signal associated with estimation of the CLI channel between the second UE and the first UE based on the one or more transmission parameters.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for may support techniques for mitigating or reducing the impact of CLI based on reporting CSI that considers the impact of CLI which may increase communication reliability and reduce communication failures. As a result, processing and power consumption may be reduced and efficient utilization of communication resources may be increased, for example, by reducing retransmissions associated with communication failures and reduced communication reliability.

Figure 8:
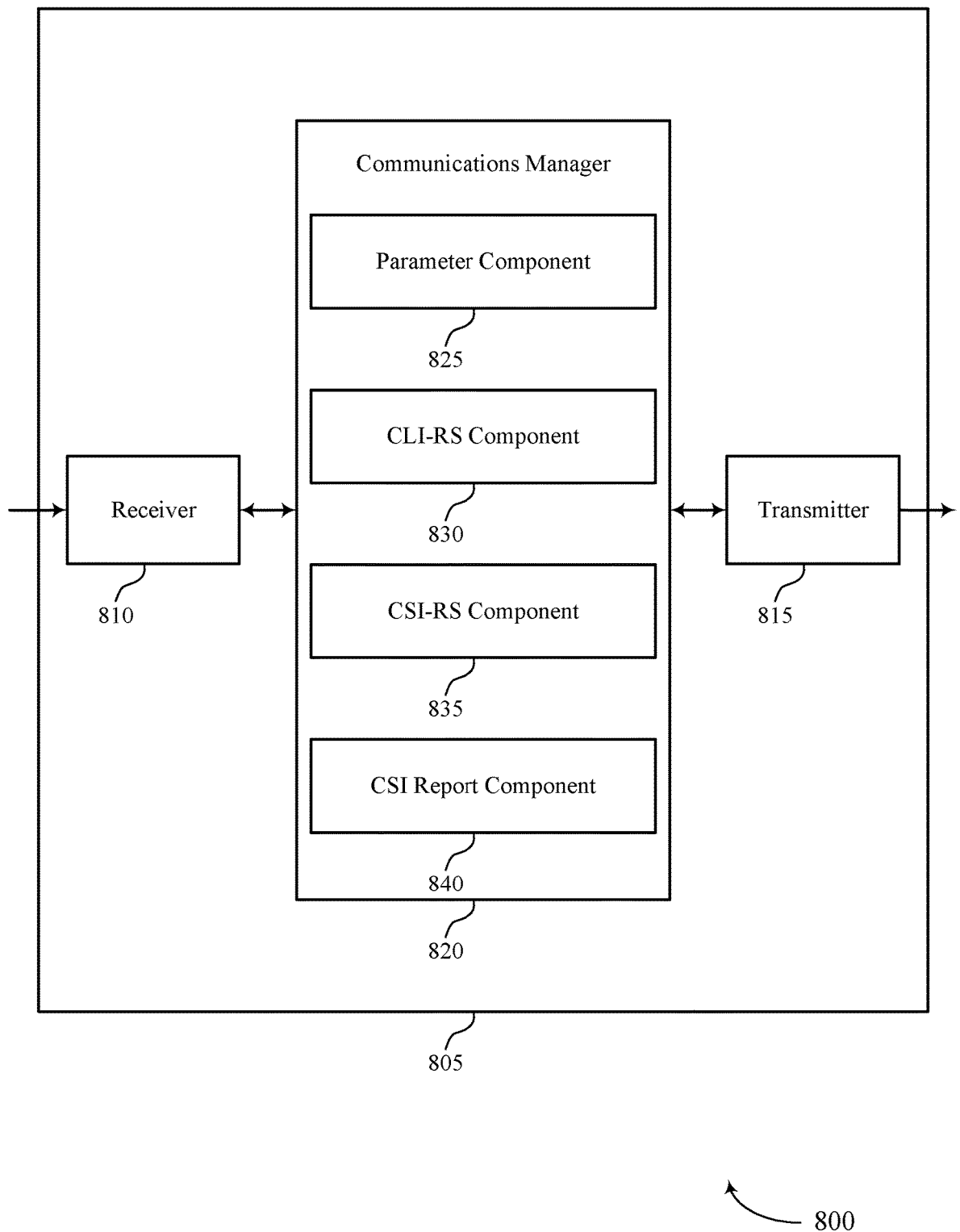

FIG. 8 shows a block diagram 800 of a device 805 that supports CLI based CSI reporting in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to CLI based CSI reporting). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to CLI based CSI reporting). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of CLI based CSI reporting as described herein. For example, the communications manager 820 may include a parameter component 825, a CLI-RS component 830, a CSI-RS component 835, a CSI report component 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first UE in accordance with examples as disclosed herein. The parameter component 825 may be configured as or otherwise support a means for obtaining one or more control messages indicating one or more transmission parameters of a multi-port reference signal associated with estimation of a CLI channel between the first UE and a second UE and indicating one or more precoding parameters associated with uplink precoding at the second UE, where the one or more transmission parameters of the multi-port reference signal indicate a quantity of two or more antenna ports for communicating the multi-port reference signal. The CLI-RS component 830 may be configured as or otherwise support a means for obtaining, using the quantity of two or more antenna ports, the multi-port reference signal associated with estimation of the CLI channel between the first UE and the second UE based on the one or more transmission parameters. The CSI-RS component 835 may be configured as or otherwise support a means for obtaining a CSI-RS associated with estimation of a channel between the first UE and a network entity. The CSI report component 840 may be configured as or otherwise support a means for outputting a report including CSI that is based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

Additionally, or alternatively, the communications manager 820 may support wireless communication at a second UE in accordance with examples as disclosed herein. The parameter component 825 may be configured as or otherwise support a means for obtaining a control message indicating one or more transmission parameters of a multi-port reference signal associated with estimation of a CLI channel between the second UE and a first UE, where the one or more transmission parameters of the multi-port reference signal indicate a quantity of two or more antenna ports for communicating the multi-port reference signal. The CLI-RS component 830 may be configured as or otherwise support a means for outputting, using the quantity of two or more antenna ports, the multi-port reference signal associated with estimation of the CLI channel between the second UE and the first UE based on the one or more transmission parameters.

Figure 9:
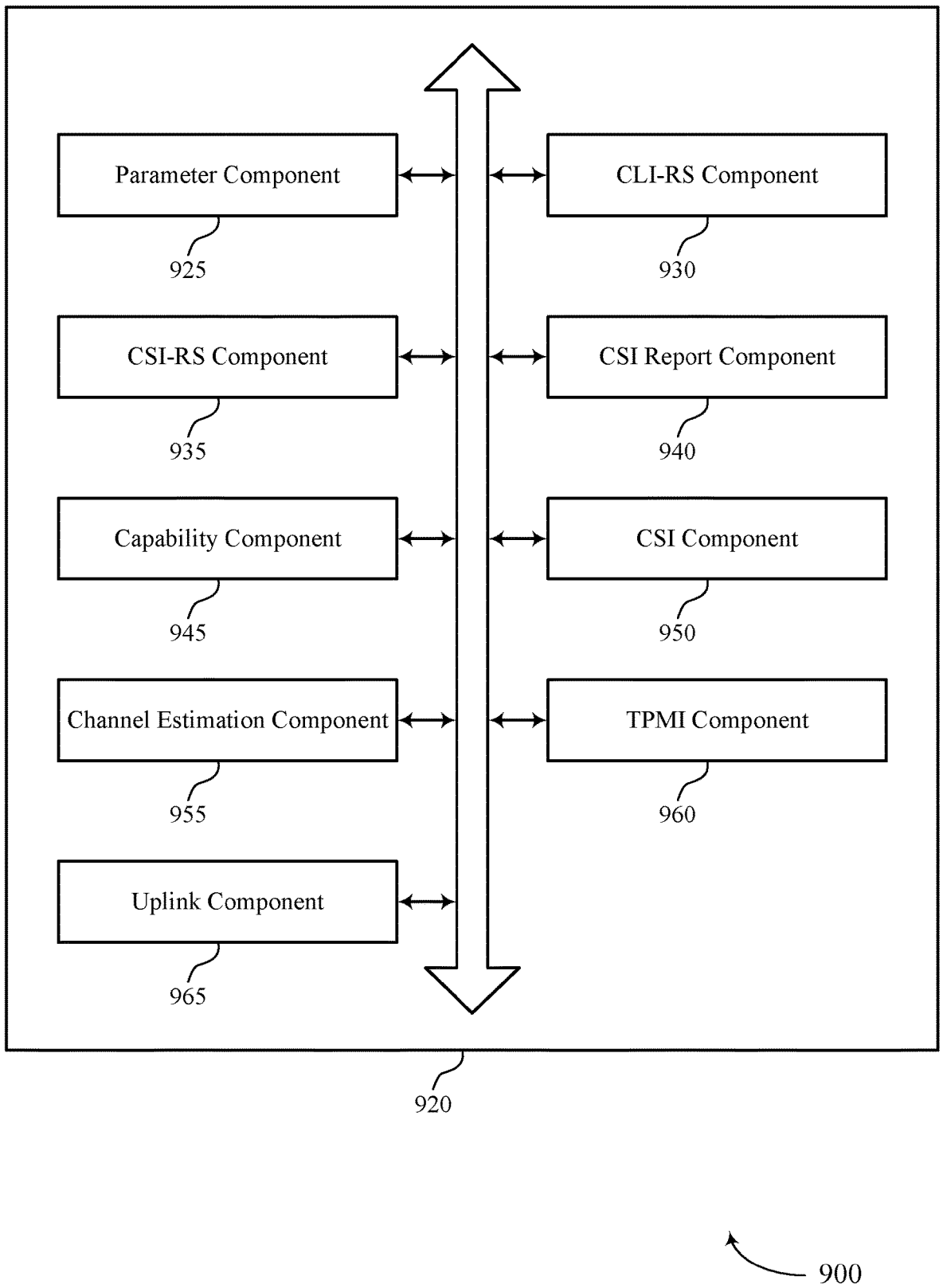
FIG. 9 shows a block diagram of a communications manager that supports CLI based CSI reporting in accordance with one or more aspects of the present disclosure.

FIG. 9 shows a block diagram 900 of a communications manager 920 that supports CLI based CSI reporting in accordance with one or more aspects of the present disclosure. The communications manager 920 may be an example of aspects of a communications manager 720, a communications manager 820, or both, as described herein. The communications manager 920, or various components thereof, may be an example of means for performing various aspects of CLI based CSI reporting as described herein. For example, the communications manager 920 may include a parameter component 925, a CLI-RS component 930, a CSI-RS component 935, a CSI report component 940, a capability component 945, a CSI component 950, a channel estimation component 955, a TPMI component 960, an uplink component 965, or any combination thereof. Each of these components may communicate, directly or indirectly, with one another (e.g., via one or more buses).

The communications manager 920 may support wireless communication at a first UE in accordance with examples as disclosed herein. The parameter component 925 may be configured as or otherwise support a means for obtaining one or more control messages indicating one or more transmission parameters of a multi-port reference signal associated with estimation of a CLI channel between the first UE and a second UE and indicating one or more precoding parameters associated with uplink precoding at the second UE, where the one or more transmission parameters of the multi-port reference signal indicate a quantity of two or more antenna ports for communicating the multi-port reference signal. The CLI-RS component 930 may be configured as or otherwise support a means for obtaining, using the quantity of two or more antenna ports, the multi-port reference signal associated with estimation of the CLI channel between the first UE and the second UE based on the one or more transmission parameters. The CSI-RS component 935 may be configured as or otherwise support a means for obtaining a CSI-RS associated with estimation of a channel between the first UE and a network entity. The CSI report component 940 may be configured as or otherwise support a means for outputting a report including CSI that is based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

In some examples, the capability component 945 may be configured as or otherwise support a means for outputting a capability message indicating a capability of the first UE to estimate the CLI channel based on the multi-port reference signal, where the one or more control messages indicating the one or more transmission parameters of the multi-port reference signal are obtained based at least in part the capability message.

In some examples, the CSI component 950 may be configured as or otherwise support a means for generating the CSI based on the one or more control messages including an indication for the first UE to generate the CSI based on the multi-port reference signal, the CSI-RS, and the one or more precoding parameters.

In some examples, the CSI component 950 may be configured as or otherwise support a means for generating, based on the one or more transmission parameters of the multi-port reference signal indicating a measurement resource for the multi-port reference signal, the CSI based on the multi-port reference signal, the CSI-RS, and the one or more precoding parameters.

In some examples, the channel estimation component 955 may be configured as or otherwise support a means for estimating the channel between the first UE and the network entity based on the CSI-RS, the CLI channel, and the one or more precoding parameters associated with uplink precoding at the second UE, the CSI based on the estimated channel.

In some examples, the channel estimation component 955 may be configured as or otherwise support a means for estimating the channel between the first UE and the network entity using a linear transformation associated with uncorrelation of antenna ports of the first UE used to receive the CSI-RS, the linear transformation based on the CLI channel and the one or more precoding parameters associated with uplink precoding at the second UE. In some examples, the CSI component 950 may be configured as or otherwise support a means for computing a spectral efficiency associated with candidate CSI based on the linear transformation, the report including the candidate CSI based on the computed spectral efficiency.

In some examples, the CSI report component 940 may be configured as or otherwise support a means for obtaining DCI that triggers reporting of the CSI that is based on the multi-port reference signal, the CSI-RS, and the one or more precoding parameters associated with uplink precoding at the second UE.

In some examples, the multi-port reference signal associated with estimation of the CLI channel is an SRS.

In some examples, the quantity of two or more antenna ports corresponds to a quantity of transmission antenna ports at the second UE.

In some examples, the CSI includes a PMI, a CQI, an RI, or a combination thereof, that is selected based on the multi-port reference signal, the CSI-RS, and the one or more precoding parameters associated with uplink precoding at the second UE.

Additionally, or alternatively, the communications manager 920 may support wireless communication at a second UE in accordance with examples as disclosed herein. In some examples, the parameter component 925 may be configured as or otherwise support a means for obtaining a control message indicating one or more transmission parameters of a multi-port reference signal associated with estimation of a CLI channel between the second UE and a first UE, where the one or more transmission parameters of the multi-port reference signal indicate a quantity of two or more antenna ports for communicating the multi-port reference signal. In some examples, the CLI-RS component 930 may be configured as or otherwise support a means for outputting, using the quantity of two or more antenna ports, the multi-port reference signal associated with estimation of the CLI channel between the second UE and the first UE based on the one or more transmission parameters.

In some examples, the CLI-RS component 930 may be configured as or otherwise support a means for obtaining a second control message that triggers communication of the multi-port reference signal, where the multi-port reference signal is output in response to the second control message.

In some examples, the second control message includes DCI that schedules an aperiodic resource for communicating the multi-port reference signal or DCI that activates an SPS resource for communicating the multi-port reference signal.

In some examples, to support outputting the multi-port reference signal, the CLI-RS component 930 may be configured as or otherwise support a means for outputting the multi-port reference signal using an SRS codebook indicated by the one or more transmission parameters, the SRS codebook associated with uplink transmissions to a network entity.

In some examples, the multi-port reference signal is a multi-port SRS. In some examples, to support outputting the multi-port reference signal, the CLI-RS component 930 may be configured as or otherwise support a means for outputting the multi-port SRS using a beam having a first beam width that is greater than a second beam width associated with SRS transmissions to a network entity.

In some examples, the multi-port reference signal is an SRS configured to enable the estimation of the CLI channel.

In some examples, the TPMI component 960 may be configured as or otherwise support a means for obtaining a second control message indicating a TPMI associated with precoding of an uplink message, the TPMI based on the CLI channel between the second UE and the first UE. In some examples, the uplink component 965 may be configured as or otherwise support a means for outputting an uplink message using a precoding matrix indicated by the TPMI.

In some examples, the quantity of two or more antenna ports corresponds to a quantity of transmission antenna ports at the second UE.

Figure 10:
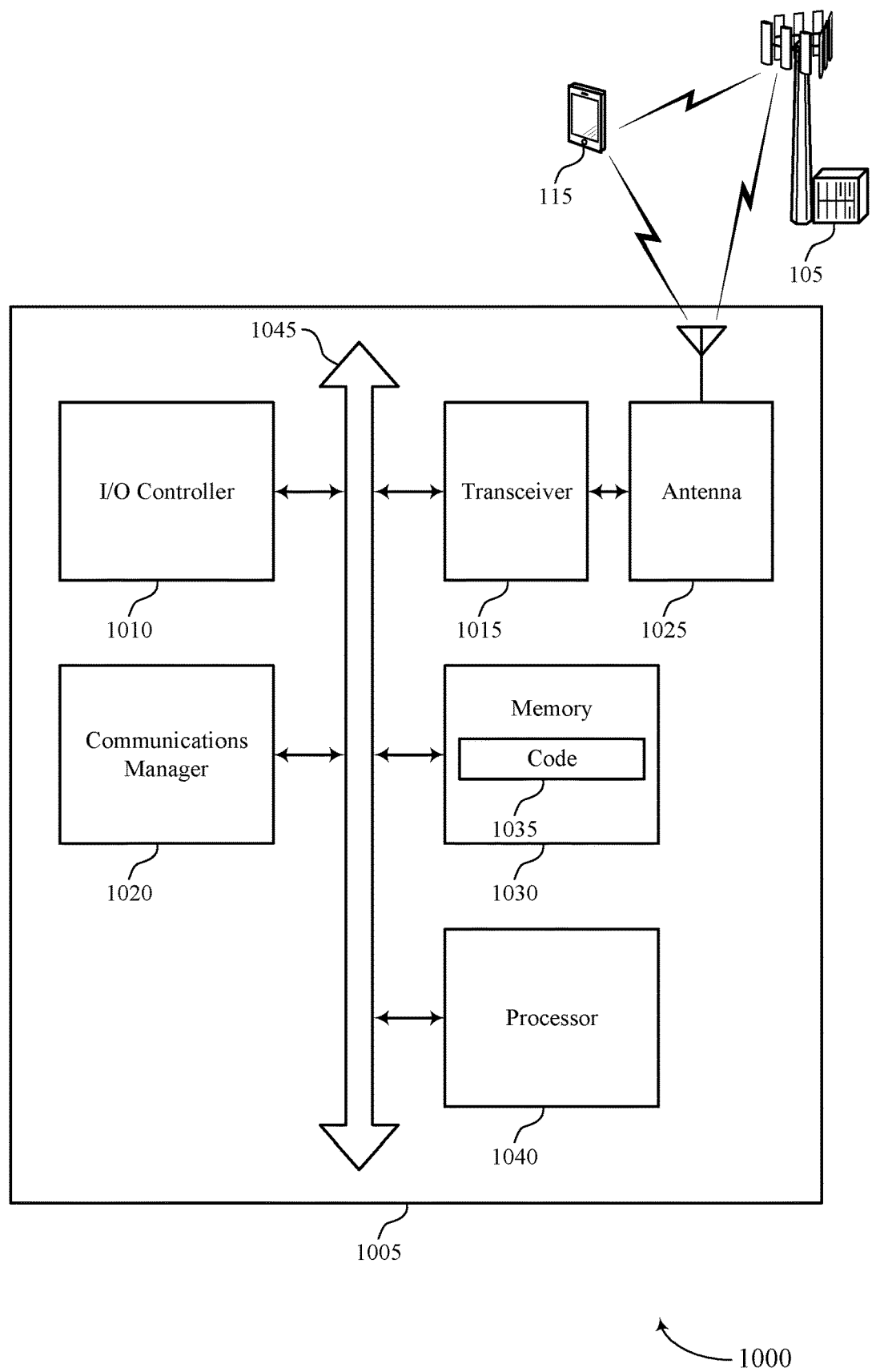
FIG. 10 shows a diagram of a system including a device that supports CLI based CSI reporting in accordance with one or more aspects of the present disclosure.

FIG. 10 shows a diagram of a system 1000 including a device 1005 that supports CLI based CSI reporting in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting CLI based CSI reporting). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for obtaining one or more control messages indicating one or more transmission parameters of a multi-port reference signal associated with estimation of a CLI channel between the first UE and a second UE and indicating one or more precoding parameters associated with uplink precoding at the second UE, where the one or more transmission parameters of the multi-port reference signal indicate a quantity of two or more antenna ports for communicating the multi-port reference signal. The communications manager 1020 may be configured as or otherwise support a means for obtaining, using the quantity of two or more antenna ports, the multi-port reference signal associated with estimation of the CLI channel between the first UE and the second UE based on the one or more transmission parameters. The communications manager 1020 may be configured as or otherwise support a means for obtaining a CSI-RS associated with estimation of a channel between the first UE and a network entity. The communications manager 1020 may be configured as or otherwise support a means for outputting a report including CSI that is based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

Additionally, or alternatively, the communications manager 1020 may support wireless communication at a second UE in accordance with examples as disclosed herein. For example, the communications manager 1020 may be configured as or otherwise support a means for obtaining a control message indicating one or more transmission parameters of a multi-port reference signal associated with estimation of a CLI channel between the second UE and a first UE, where the one or more transmission parameters of the multi-port reference signal indicate a quantity of two or more antenna ports for communicating the multi-port reference signal. The communications manager 1020 may be configured as or otherwise support a means for outputting, using the quantity of two or more antenna ports, the multi-port reference signal associated with estimation of the CLI channel between the second UE and the first UE based on the one or more transmission parameters.

By including or configuring the communications manager 1020 in accordance with examples as described herein, the device 1005 may support techniques for increased communication reliability, CLI reduction and mitigation (e.g., inter-UE CLI reduction), increased full duplex communication reliability, increased data rates, reduced power consumption, more efficient utilization of communication resources, increased coordination between devices, and longer battery life, among other benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of CLI based CSI reporting as described herein, or the processor 1040 and the memory 1030 may be otherwise configured to perform or support such operations.

Figure 11:
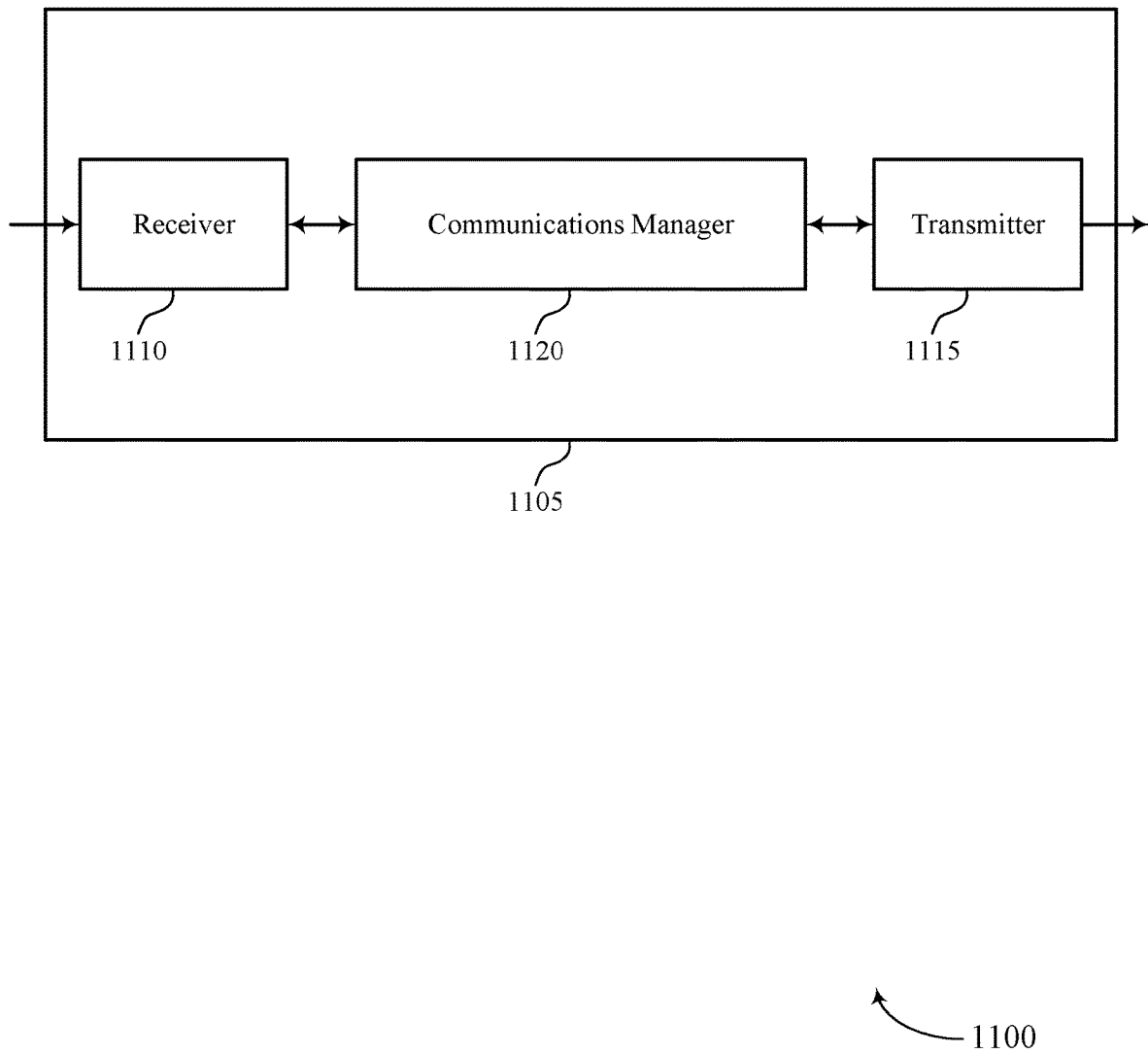
FIGS. 11 and 12 show block diagrams of devices that support CLI based CSI reporting in accordance with one or more aspects of the present disclosure.

FIG. 11 shows a block diagram 1100 of a device 1105 that supports CLI based CSI reporting in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of CLI based CSI reporting as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for outputting one or more control messages indicating one or more transmission parameters of a multi-port reference signal associated with estimation of a CLI channel between a first UE and a second UE and indicating one or more precoding parameters associated with uplink precoding at the second UE, where the one or more transmission parameters of the multi-port reference signal indicate a quantity of two or more antenna ports for communicating the multi-port reference signal. The communications manager 1120 may be configured as or otherwise support a means for outputting a CSI-RS associated with estimation of a channel between the first UE and the network entity. The communications manager 1120 may be configured as or otherwise support a means for obtaining a report including CSI associated with the channel between the first UE and the network entity, the CSI based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for mitigating or reducing the impact of CLI based on reporting CSI that considers the impact of CLI which may increase communication reliability and reduce communication failures. As a result, processing and power consumption may be reduced and efficient utilization of communication resources may be increased, for example, by reducing retransmissions associated with communication failures and reduced communication reliability.

Figure 12:
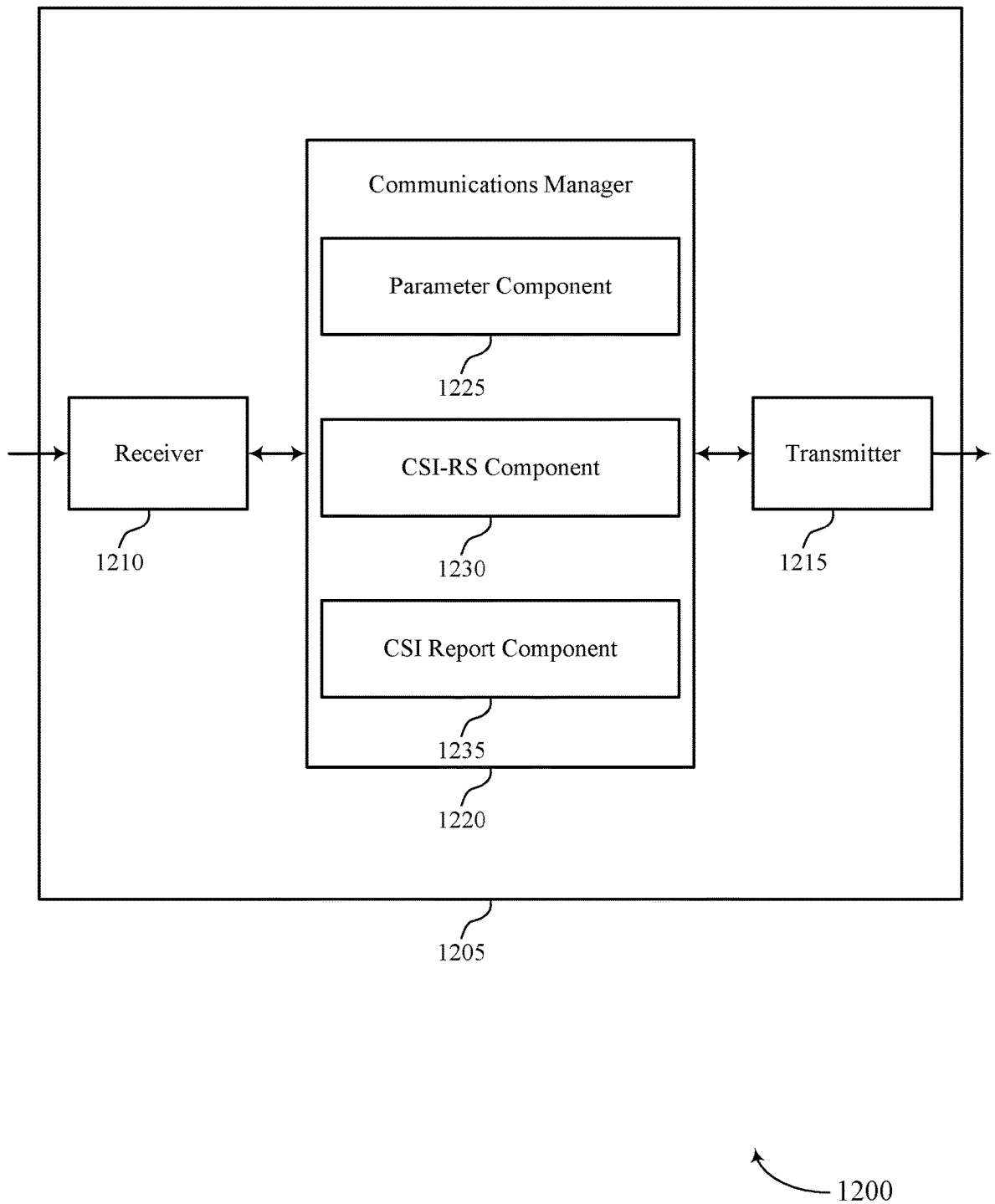

FIG. 12 shows a block diagram 1200 of a device 1205 that supports CLI based CSI reporting in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of CLI based CSI reporting as described herein. For example, the communications manager 1220 may include a parameter component 1225, a CSI-RS component 1230, a CSI report component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The parameter component 1225 may be configured as or otherwise support a means for outputting one or more control messages indicating one or more transmission parameters of a multi-port reference signal associated with estimation of a CLI channel between a first UE and a second UE and indicating one or more precoding parameters associated with uplink precoding at the second UE, where the one or more transmission parameters of the multi-port reference signal indicate a quantity of two or more antenna ports for communicating the multi-port reference signal. The CSI-RS component 1230 may be configured as or otherwise support a means for outputting a CSI-RS associated with estimation of a channel between the first UE and the network entity. The CSI report component 1235 may be configured as or otherwise support a means for obtaining a report including CSI associated with the channel between the first UE and the network entity, the CSI based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

Figure 13:
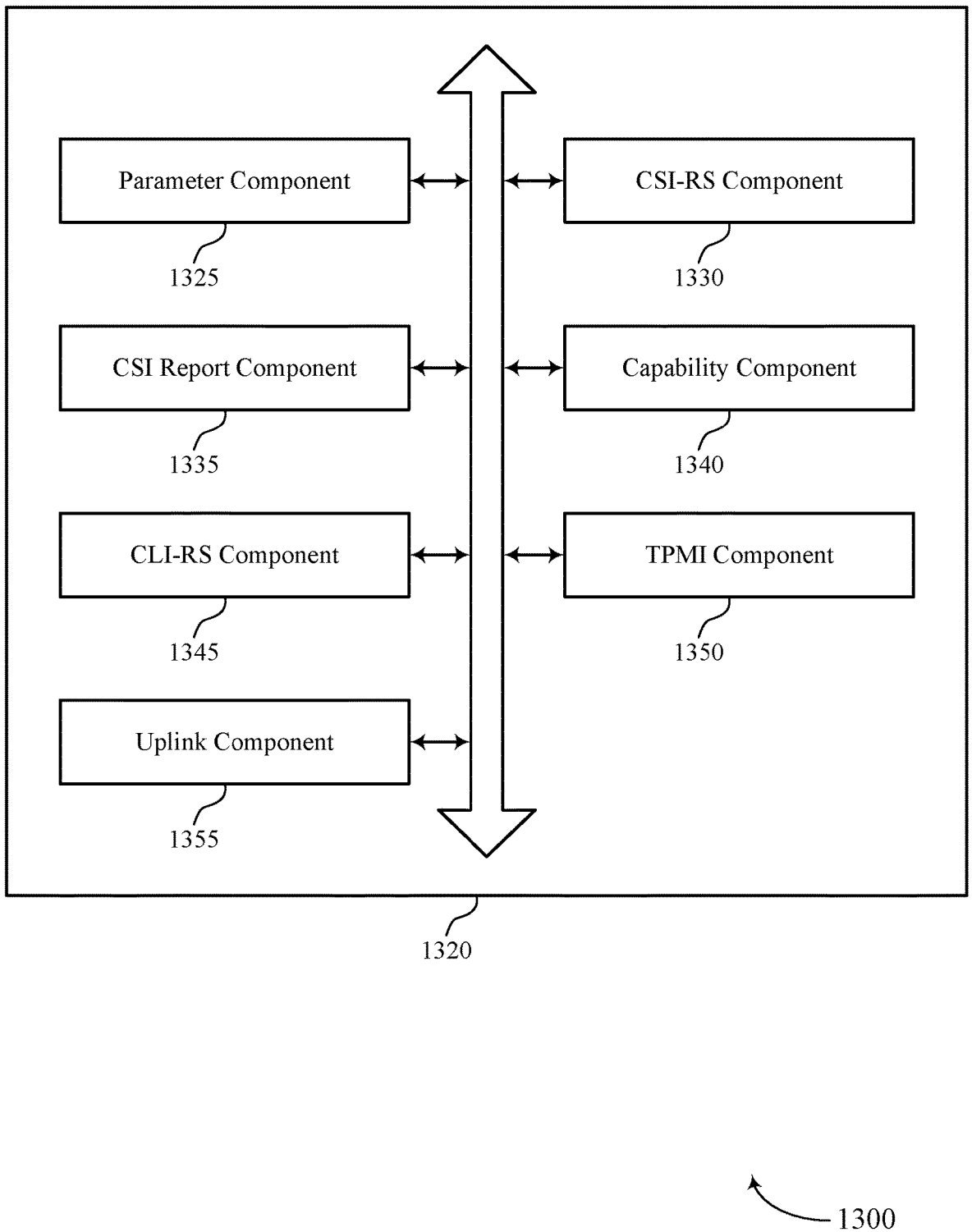
FIG. 13 shows a block diagram of a communications manager that supports CLI based CSI reporting in accordance with one or more aspects of the present disclosure.

FIG. 13 shows a block diagram 1300 of a communications manager 1320 that supports CLI based CSI reporting in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of CLI based CSI reporting as described herein. For example, the communications manager 1320 may include a parameter component 1325, a CSI-RS component 1330, a CSI report component 1335, a capability component 1340, a CLI-RS component 1345, a TPMI component 1350, an uplink component 1355, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The parameter component 1325 may be configured as or otherwise support a means for outputting one or more control messages indicating one or more transmission parameters of a multi-port reference signal associated with estimation of a CLI channel between a first UE and a second UE and indicating one or more precoding parameters associated with uplink precoding at the second UE, where the one or more transmission parameters of the multi-port reference signal indicate a quantity of two or more antenna ports for communicating the multi-port reference signal. The CSI-RS component 1330 may be configured as or otherwise support a means for outputting a CSI-RS associated with estimation of a channel between the first UE and the network entity. The CSI report component 1335 may be configured as or otherwise support a means for obtaining a report including CSI associated with the channel between the first UE and the network entity, the CSI based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

In some examples, the capability component 1340 may be configured as or otherwise support a means for obtaining a capability message indicating a capability of the first UE to estimate the CLI channel based on the multi-port reference signal, where the one or more control messages indicating the one or more transmission parameters of the multi-port reference signal are output based at least in part the capability message.

In some examples, the CLI-RS component 1345 may be configured as or otherwise support a means for outputting a second control message that triggers communication of the multi-port reference signal.

In some examples, the second control message includes DCI that schedules an aperiodic resource for communicating the multi-port reference signal or DCI that activates an SPS resource for communicating the multi-port reference signal.

In some examples, the CSI report component 1335 may be configured as or otherwise support a means for outputting DCI triggering reporting of the CSI that is based on the multi-port reference signal, the CSI-RS, and the one or more precoding parameters associated with uplink precoding at the second UE.

In some examples, the one or more transmission parameters of the multi-port reference signal indicate an SRS codebook for communicating the multi-port reference signal.

In some examples, the one or more transmission parameters of the multi-port reference signal indicate a beam for communicating the multi-port reference signal, the beam having a first beam width that is greater than a second beam width associated with SRS transmissions to the network entity.

In some examples, the multi-port reference signal associated with estimation of the CLI channel is an SRS.

In some examples, the TPMI component 1350 may be configured as or otherwise support a means for outputting a second control message including a TPMI associated with precoding an uplink message at the second UE, the TPMI based on the CSI associated with the channel between the first UE and the network entity. In some examples, the uplink component 1355 may be configured as or otherwise support a means for obtaining an uplink message in accordance with a precoding matrix indicated by the TPMI.

Figure 14:
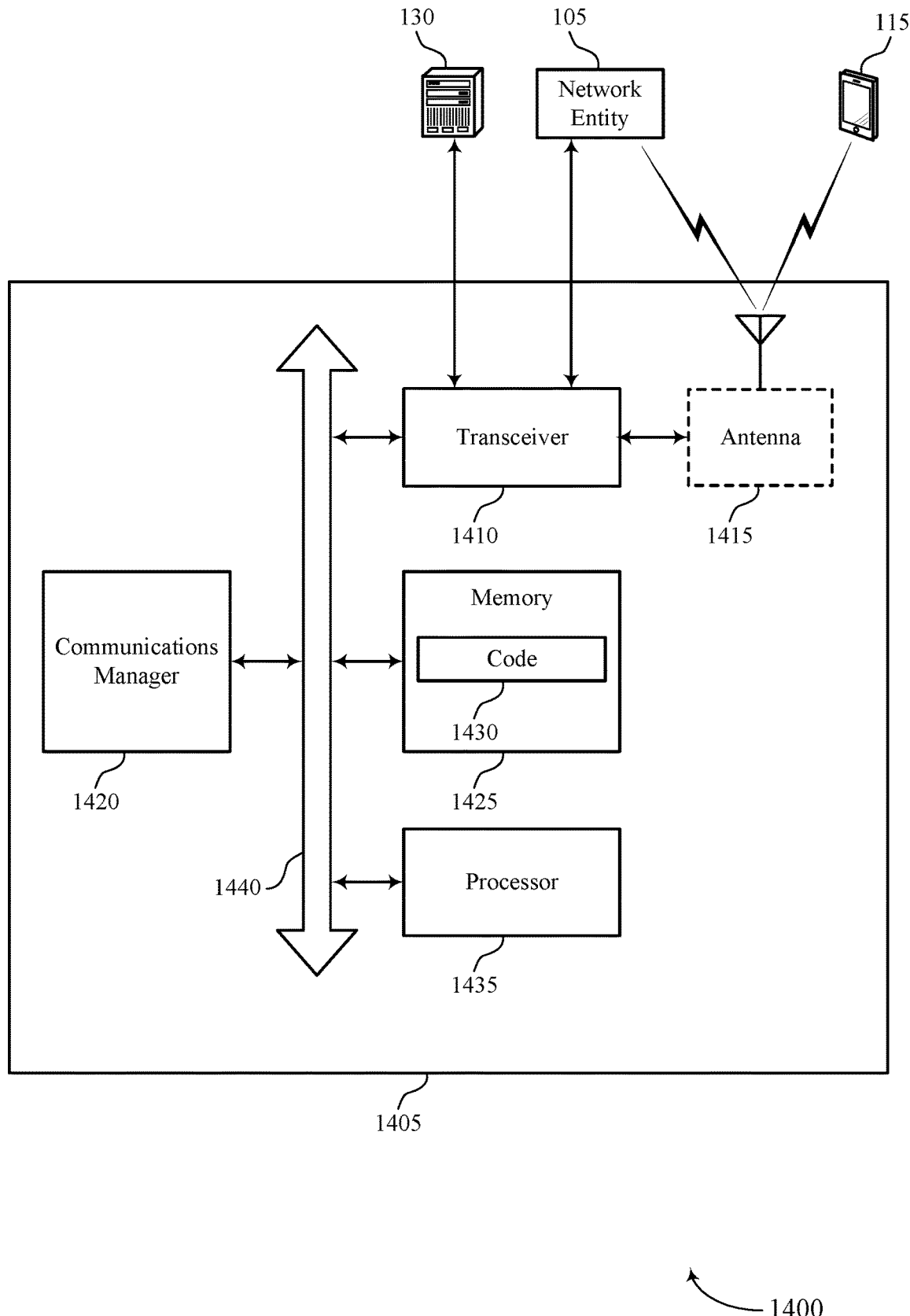
FIG. 14 shows a diagram of a system including a device that supports CLI based CSI reporting in accordance with one or more aspects of the present disclosure.

FIG. 14 shows a diagram of a system 1400 including a device 1405 that supports CLI based CSI reporting in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications via one or more wired interfaces, via one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting CLI based CSI reporting). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for outputting one or more control messages indicating one or more transmission parameters of a multi-port reference signal associated with estimation of a CLI channel between a first UE and a second UE and indicating one or more precoding parameters associated with uplink precoding at the second UE, where the one or more transmission parameters of the multi-port reference signal indicate a quantity of two or more antenna ports for communicating the multi-port reference signal. The communications manager 1420 may be configured as or otherwise support a means for outputting a CSI-RS associated with estimation of a channel between the first UE and the network entity. The communications manager 1420 may be configured as or otherwise support a means for obtaining a report including CSI associated with the channel between the first UE and the network entity, the CSI based on the multi-port reference signal associated with estimation of the CLI channel between the first UE and the second UE, the CSI-RS associated with estimation of the channel between the first UE and the network entity, and the one or more precoding parameters associated with uplink precoding at the second UE.

By including or configuring the communications manager 1420 in accordance with examples as described herein, the device 1405 may support techniques for increased communication reliability, CLI reduction and mitigation (e.g., inter-UE CLI reduction), increased full duplex communication reliability, increased data rates, reduced power consumption, more efficient utilization of communication resources, increased coordination between devices, and longer battery life, among other benefits.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of CLI based CSI reporting as described herein, or the processor 1435 and the memory 1425 may be otherwise configured to perform or support such operations.

Figure 15:
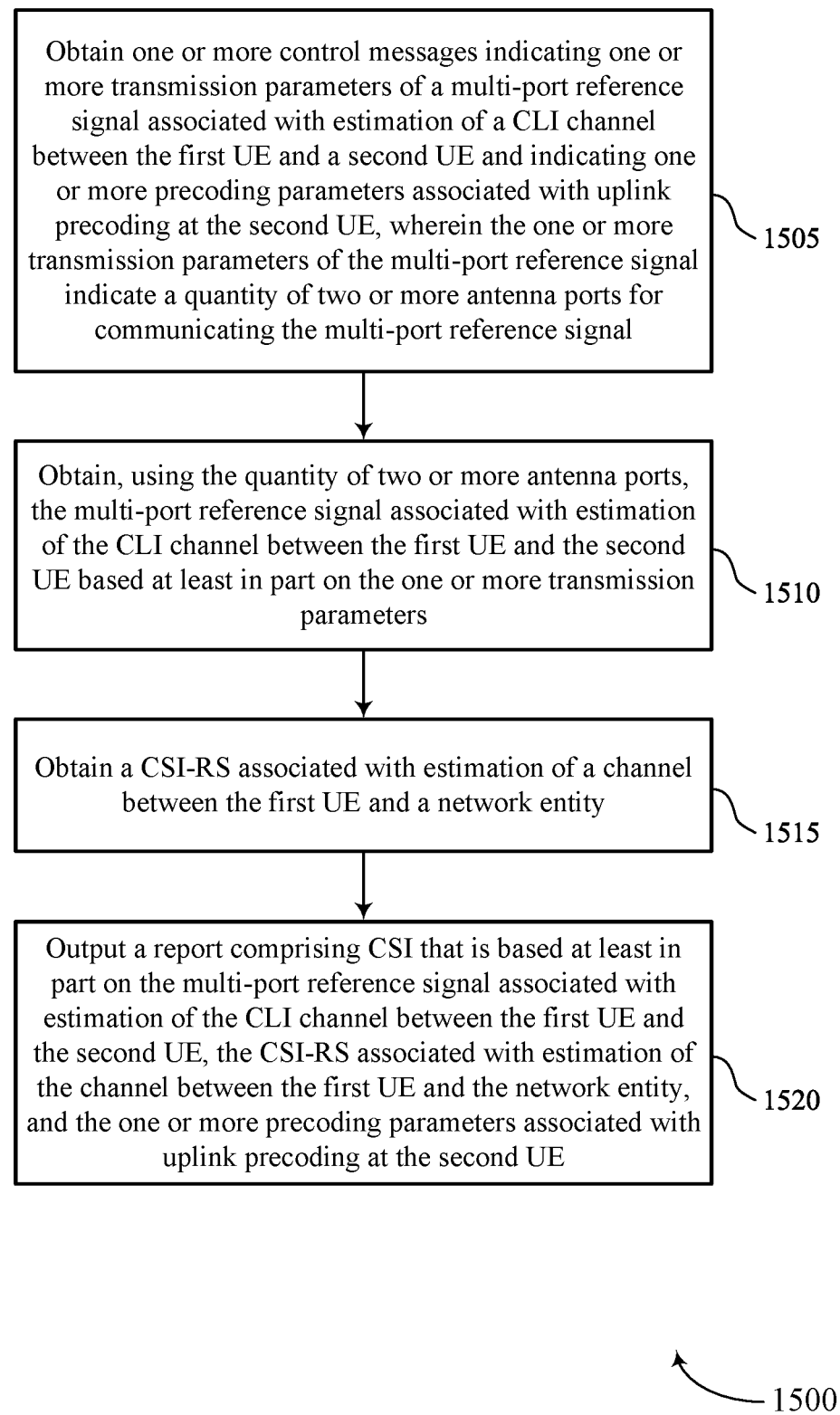
FIGS. 15 through 23 show flowcharts illustrating methods that support CLI based CSI reporting in accordance with one or more aspects of the present disclosure.

FIG. 15 shows a flowchart illustrating a method 1500 that supports CLI based CSI reporting in accordance with one or more aspects of the present disclosure. The operations of the method 1500 may be implemented by a first UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include obtaining one or more control messages indicating one or more transmission parameters of a multi-port reference signal associated with estimation of a CLI channel between the first UE and a second UE and indicating one or more precoding parameters associated with uplink precoding at the second UE, where the one or more transmission parameters of the multi-port reference signal indicate a quantity of two or more antenna ports for communicating the multi-port reference signal. The operations of 1505 may be performed in accordance with examples as disclosed herein. In some examples, aspects of the operations of 1505 may be performed by a parameter component 925 as described with reference to FIG. 9.

At 1510, the method may include obtaining, using the quantity of two or more antenna ports, the multi-port reference signal associated with estimation of the CLI channel between the first UE and the second UE based on the one or more transmission parameters. The operations of 1510 may be performed in accordance with examples as disclosed herein. In some examples, aspects of the operations of 1510 may be performed by a CLI-RS component 930 as described with reference to FIG. 9.

At 1515, the method may include obtaining a CSI-RS associated with estimation of a channel between the first UE and a network entity. The operations of 1515 may be performed in accordance with examples as disclosed herein. In some examples, aspects of the operations of 1515 may be performed by a CSI-RS component 935 as described with reference to FIG. 9.

At 1520, the method may include outputting a report including CSI that is based on the multi-port reference signal associated with estimation of the CLI channel between the first UE and the second UE, the CSI-RS associated with estimation of the channel between the first UE and the network entity, and the one or more precoding parameters associated with uplink precoding at the second UE. The operations of 1520 may be performed in accordance with examples as disclosed herein. In some examples, aspects of the operations of 1520 may be performed by a CSI report component 940 as described with reference to FIG. 9.

Figure 16:
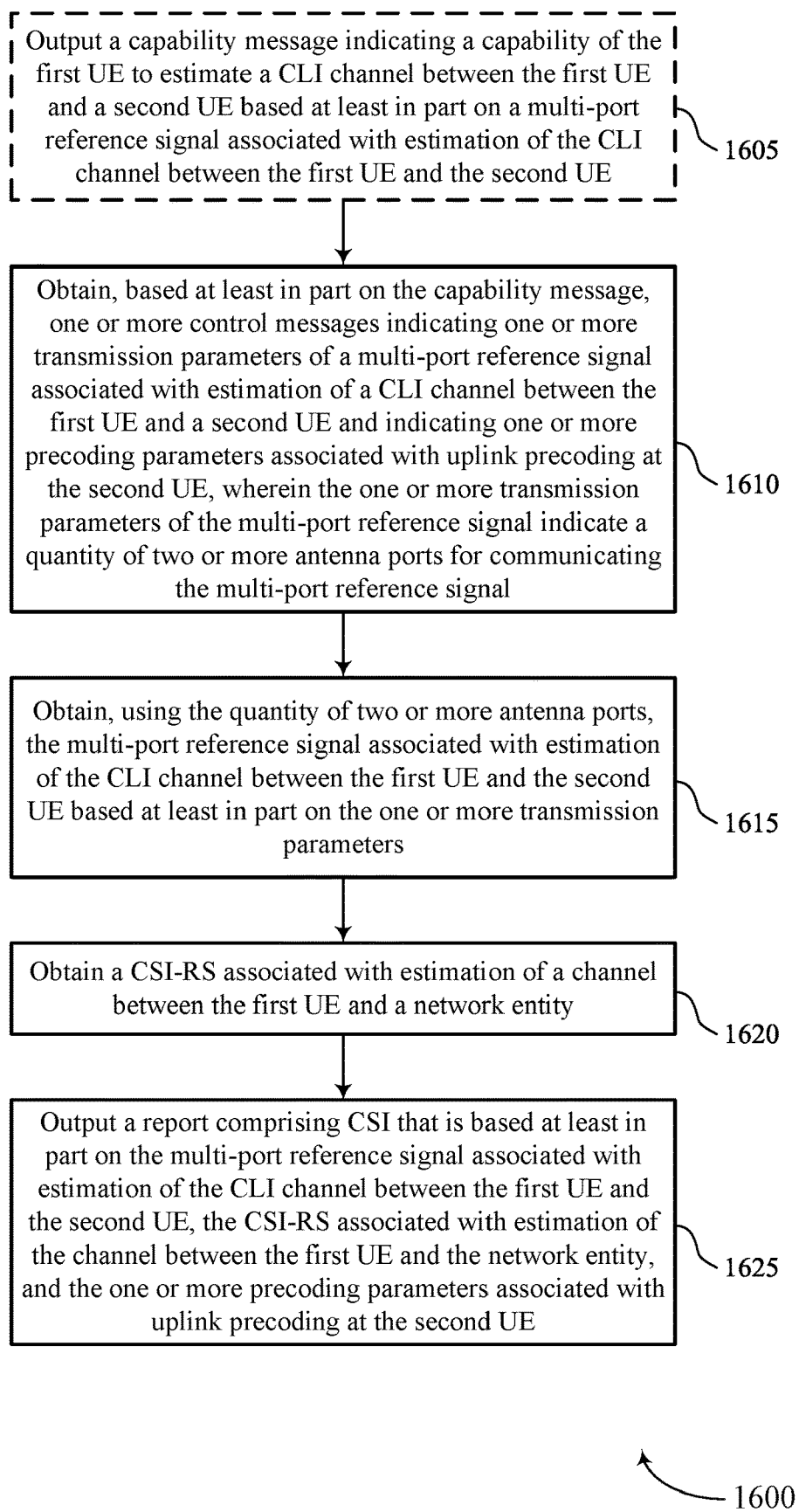

FIG. 16 shows a flowchart illustrating a method 1600 that supports CLI based CSI reporting in accordance with one or more aspects of the present disclosure. The operations of the method 1600 may be implemented by a first UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include outputting a capability message indicating a capability of the first UE to estimate a CLI channel between the first UE and a second UE based on a multi-port reference signal associated with estimation of the CLI channel between the first UE and the second UE. The operations of 1605 may be performed in accordance with examples as disclosed herein. In some examples, aspects of the operations of 1605 may be performed by a capability component 945 as described with reference to FIG. 9.

At 1610, the method may include obtaining, based on the capability message, one or more control messages indicating one or more transmission parameters of a multi-port reference signal associated with estimation of a CLI channel between the first UE and a second UE and indicating one or more precoding parameters associated with uplink precoding at the second UE, where the one or more transmission parameters of the multi-port reference signal indicate a quantity of two or more antenna ports for communicating the multi-port reference signal. The operations of 1610 may be performed in accordance with examples as disclosed herein. In some examples, aspects of the operations of 1610 may be performed by a parameter component 925 as described with reference to FIG. 9.

At 1615, the method may include obtaining, using the quantity of two or more antenna ports, the multi-port reference signal associated with estimation of the CLI channel between the first UE and the second UE based on the one or more transmission parameters. The operations of 1615 may be performed in accordance with examples as disclosed herein. In some examples, aspects of the operations of 1615 may be performed by a CLI-RS component 930 as described with reference to FIG. 9.

At 1620, the method may include obtaining a CSI-RS associated with estimation of a channel between the first UE and a network entity. The operations of 1620 may be performed in accordance with examples as disclosed herein. In some examples, aspects of the operations of 1620 may be performed by a CSI-RS component 935 as described with reference to FIG. 9.

At 1625, the method may include outputting a report including CSI that is based on the multi-port reference signal associated with estimation of the CLI channel between the first UE and the second UE, the CSI-RS associated with estimation of the channel between the first UE and the network entity, and the one or more precoding parameters associated with uplink precoding at the second UE. The operations of 1625 may be performed in accordance with examples as disclosed herein. In some examples, aspects of the operations of 1625 may be performed by a CSI report component 940 as described with reference to FIG. 9.

Figure 17:
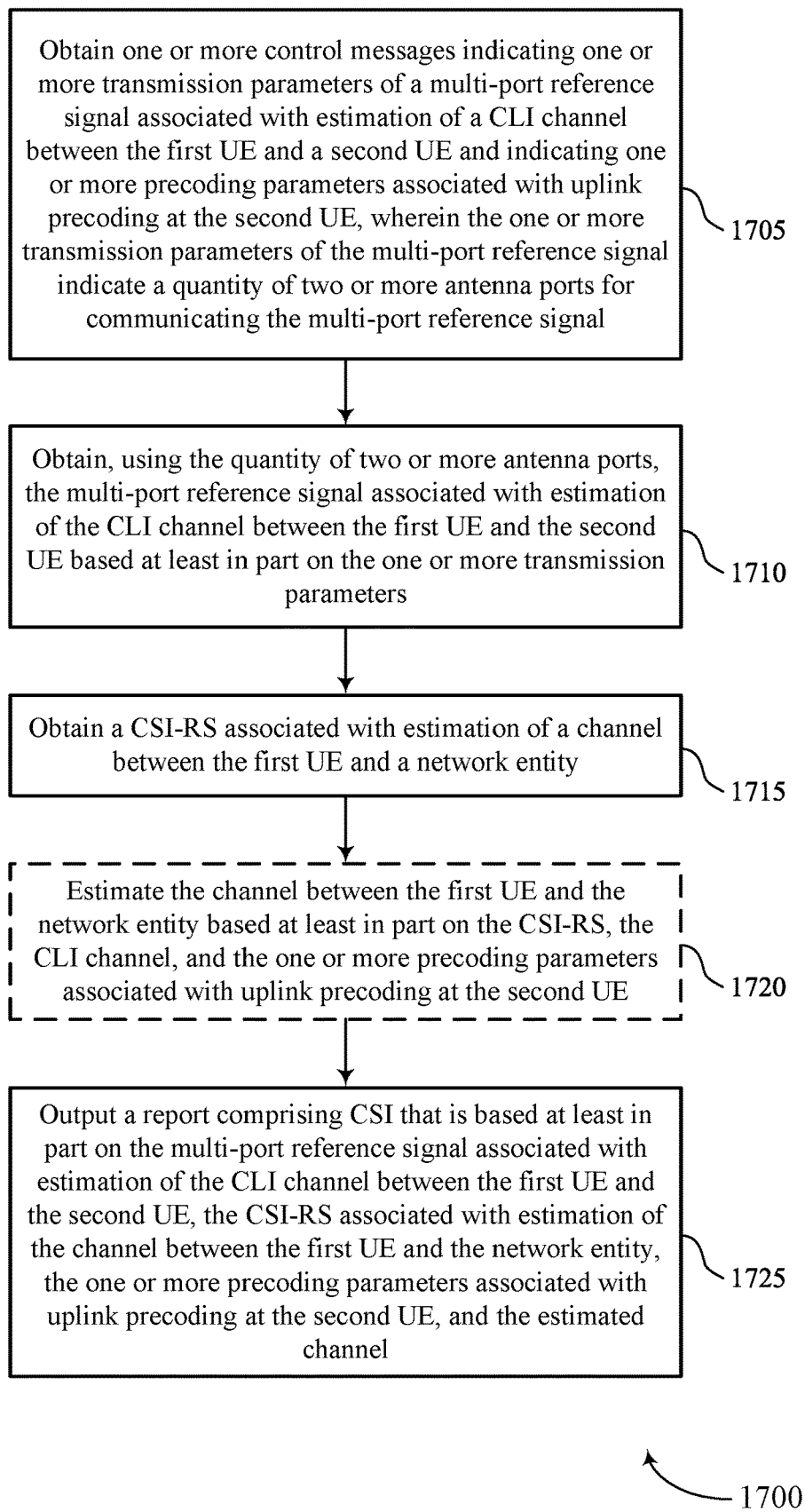

FIG. 17 shows a flowchart illustrating a method 1700 that supports CLI based CSI reporting in accordance with one or more aspects of the present disclosure. The operations of the method 1700 may be implemented by a first UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include obtaining one or more control messages indicating one or more transmission parameters of a multi-port reference signal associated with estimation of a CLI channel between the first UE and a second UE and indicating one or more precoding parameters associated with uplink precoding at the second UE, where the one or more transmission parameters of the multi-port reference signal indicate a quantity of two or more antenna ports for communicating the multi-port reference signal. The operations of 1705 may be performed in accordance with examples as disclosed herein. In some examples, aspects of the operations of 1705 may be performed by a parameter component 925 as described with reference to FIG. 9.

At 1710, the method may include obtaining, using the quantity of two or more antenna ports, the multi-port reference signal associated with estimation of the CLI channel between the first UE and the second UE based on the one or more transmission parameters. The operations of 1710 may be performed in accordance with examples as disclosed herein. In some examples, aspects of the operations of 1710 may be performed by a CLI-RS component 930 as described with reference to FIG. 9.

At 1715, the method may include obtaining a CSI-RS associated with estimation of a channel between the first UE and a network entity. The operations of 1715 may be performed in accordance with examples as disclosed herein. In some examples, aspects of the operations of 1715 may be performed by a CSI-RS component 935 as described with reference to FIG. 9.

At 1720, the method may include estimating the channel between the first UE and the network entity based on the CSI-RS, the CLI channel, and the one or more precoding parameters associated with uplink precoding at the second UE. The operations of 1720 may be performed in accordance with examples as disclosed herein. In some examples, aspects of the operations of 1720 may be performed by a channel estimation component 955 as described with reference to FIG. 9.

At 1725, the method may include outputting a report including CSI that is based on the multi-port reference signal associated with estimation of the CLI channel between the first UE and the second UE, the CSI-RS associated with estimation of the channel between the first UE and the network entity, the one or more precoding parameters associated with uplink precoding at the second UE, and the estimated channel. The operations of 1725 may be performed in accordance with examples as disclosed herein. In some examples, aspects of the operations of 1725 may be performed by a CSI report component 940 as described with reference to FIG. 9.

Figure 18:
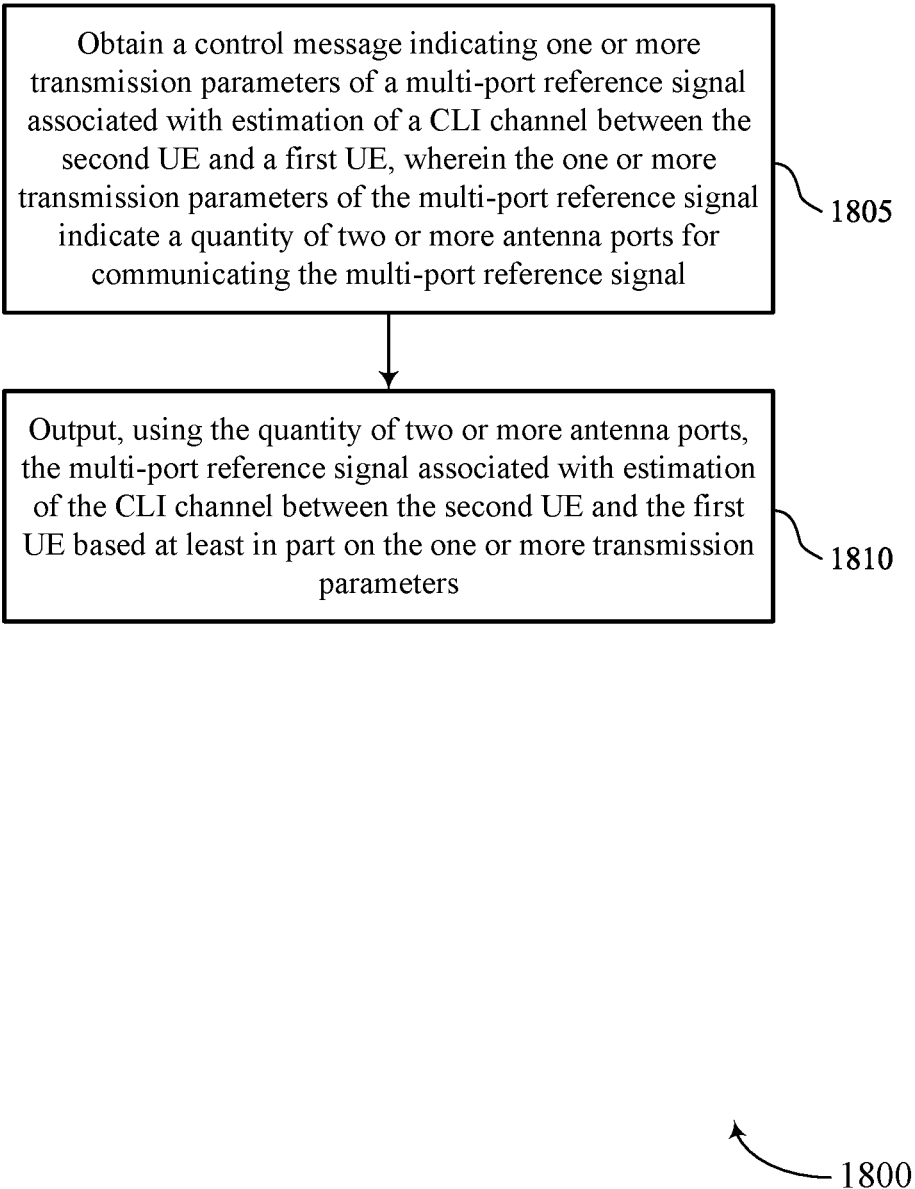

FIG. 18 shows a flowchart illustrating a method 1800 that supports CLI based CSI reporting in accordance with one or more aspects of the present disclosure. The operations of the method 1800 may be implemented by a second UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1805, the method may include obtaining a control message indicating one or more transmission parameters of a multi-port reference signal associated with estimation of a CLI channel between the second UE and a first UE, where the one or more transmission parameters of the multi-port reference signal indicate a quantity of two or more antenna ports for communicating the multi-port reference signal. The operations of 1805 may be performed in accordance with examples as disclosed herein. In some examples, aspects of the operations of 1805 may be performed by a parameter component 925 as described with reference to FIG. 9.

At 1810, the method may include outputting, using the quantity of two or more antenna ports, the multi-port reference signal associated with estimation of the CLI channel between the second UE and the first UE based on the one or more transmission parameters. The operations of 1810 may be performed in accordance with examples as disclosed herein. In some examples, aspects of the operations of 1810 may be performed by a CLI-RS component 930 as described with reference to FIG. 9.

Figure 19:
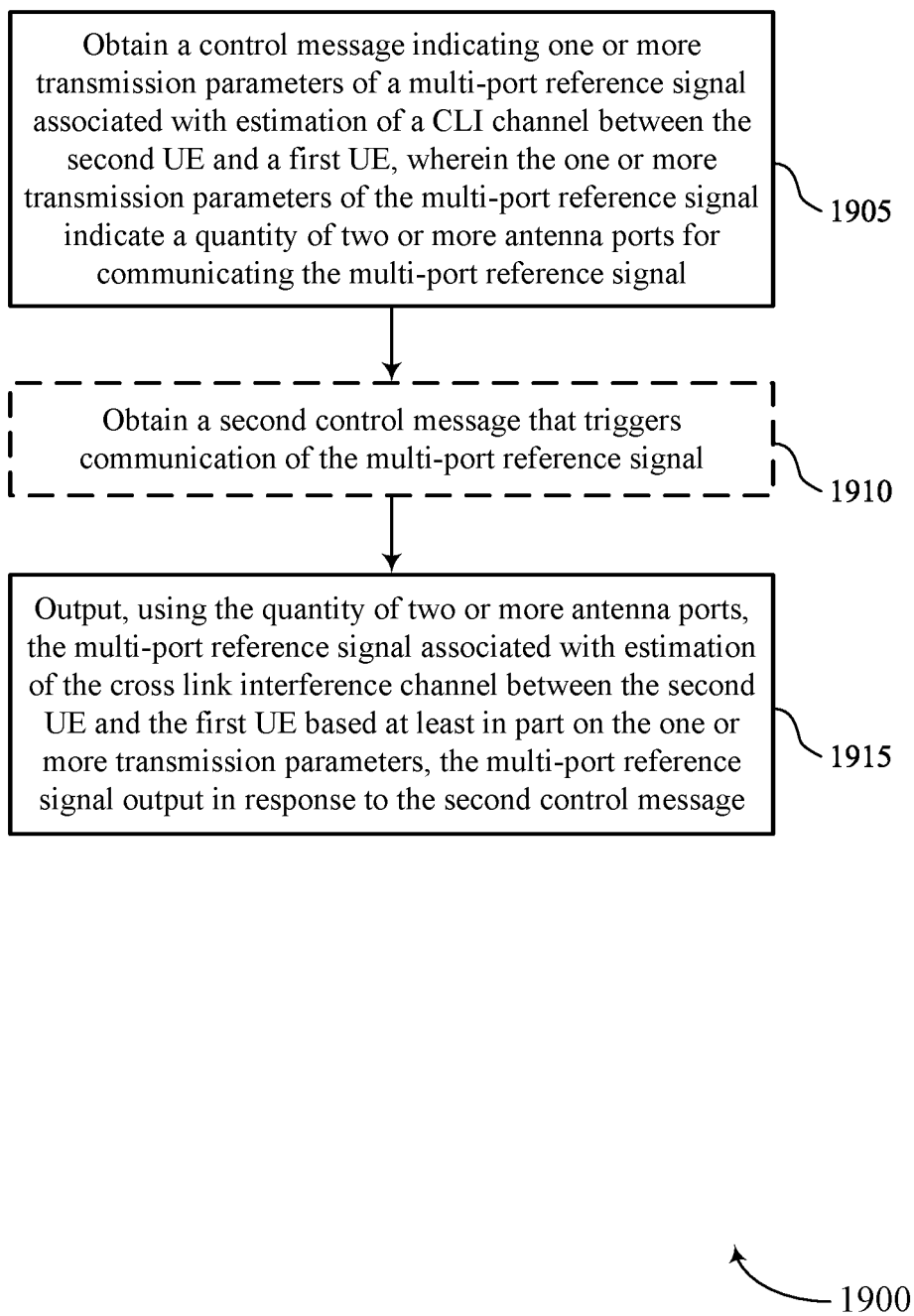

FIG. 19 shows a flowchart illustrating a method 1900 that supports CLI based CSI reporting in accordance with one or more aspects of the present disclosure. The operations of the method 1900 may be implemented by a second UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1905, the method may include obtaining a control message indicating one or more transmission parameters of a multi-port reference signal associated with estimation of a CLI channel between the second UE and a first UE, where the one or more transmission parameters of the multi-port reference signal indicate a quantity of two or more antenna ports for communicating the multi-port reference signal. The operations of 1905 may be performed in accordance with examples as disclosed herein. In some examples, aspects of the operations of 1905 may be performed by a parameter component 925 as described with reference to FIG. 9.

At 1910, the method may include obtaining a second control message that triggers communication of the multi-port reference signal. The operations of 1910 may be performed in accordance with examples as disclosed herein. In some examples, aspects of the operations of 1910 may be performed by a CLI-RS component 930 as described with reference to FIG. 9.

At 1915, the method may include outputting, using the quantity of two or more antenna ports, the multi-port reference signal associated with estimation of the CLI channel between the second UE and the first UE based on the one or more transmission parameters, the multi-port reference signal output in response to the second control message. The operations of 1915 may be performed in accordance with examples as disclosed herein. In some examples, aspects of the operations of 1915 may be performed by a CLI-RS component 930 as described with reference to FIG. 9.

Figure 20:
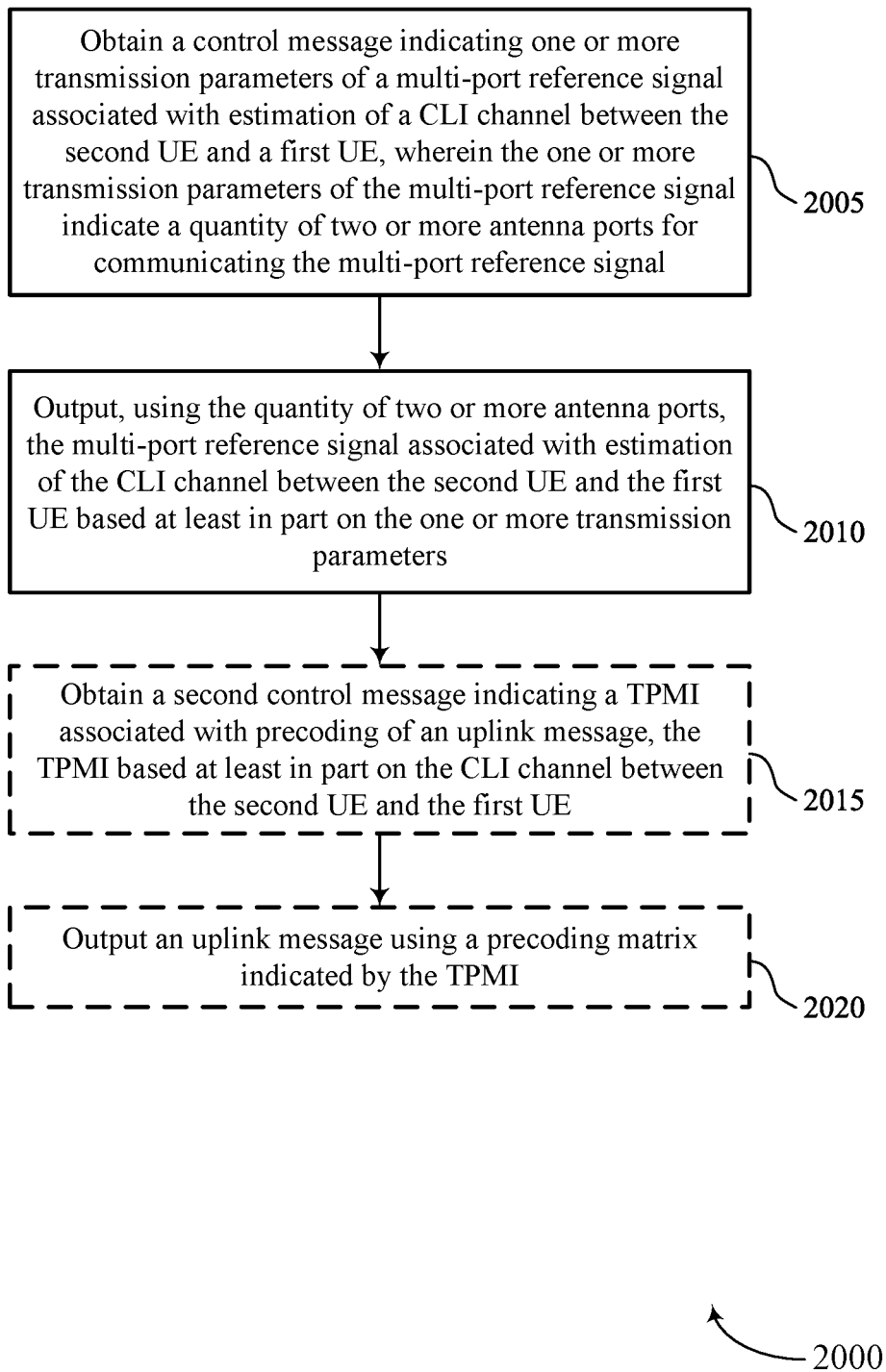

FIG. 20 shows a flowchart illustrating a method 2000 that supports CLI based CSI reporting in accordance with one or more aspects of the present disclosure. The operations of the method 2000 may be implemented by a second UE or its components as described herein. For example, the operations of the method 2000 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 2005, the method may include obtaining a control message indicating one or more transmission parameters of a multi-port reference signal associated with estimation of a CLI channel between the second UE and a first UE, where the one or more transmission parameters of the multi-port reference signal indicate a quantity of two or more antenna ports for communicating the multi-port reference signal. The operations of 2005 may be performed in accordance with examples as disclosed herein. In some examples, aspects of the operations of 2005 may be performed by a parameter component 925 as described with reference to FIG. 9.

At 2010, the method may include outputting, using the quantity of two or more antenna ports, the multi-port reference signal associated with estimation of the CLI channel between the second UE and the first UE based on the one or more transmission parameters. The operations of 2010 may be performed in accordance with examples as disclosed herein. In some examples, aspects of the operations of 2010 may be performed by a CLI-RS component 930 as described with reference to FIG. 9.

At 2015, the method may include obtaining a second control message indicating a TPMI associated with precoding of an uplink message, the TPMI based on the CLI channel between the second UE and the first UE. The operations of 2015 may be performed in accordance with examples as disclosed herein. In some examples, aspects of the operations of 2015 may be performed by a TPMI component 960 as described with reference to FIG. 9.

At 2020, the method may include outputting an uplink message using a precoding matrix indicated by the TPMI. The operations of 2020 may be performed in accordance with examples as disclosed herein. In some examples, aspects of the operations of 2020 may be performed by an uplink component 965 as described with reference to FIG. 9.

Figure 21:
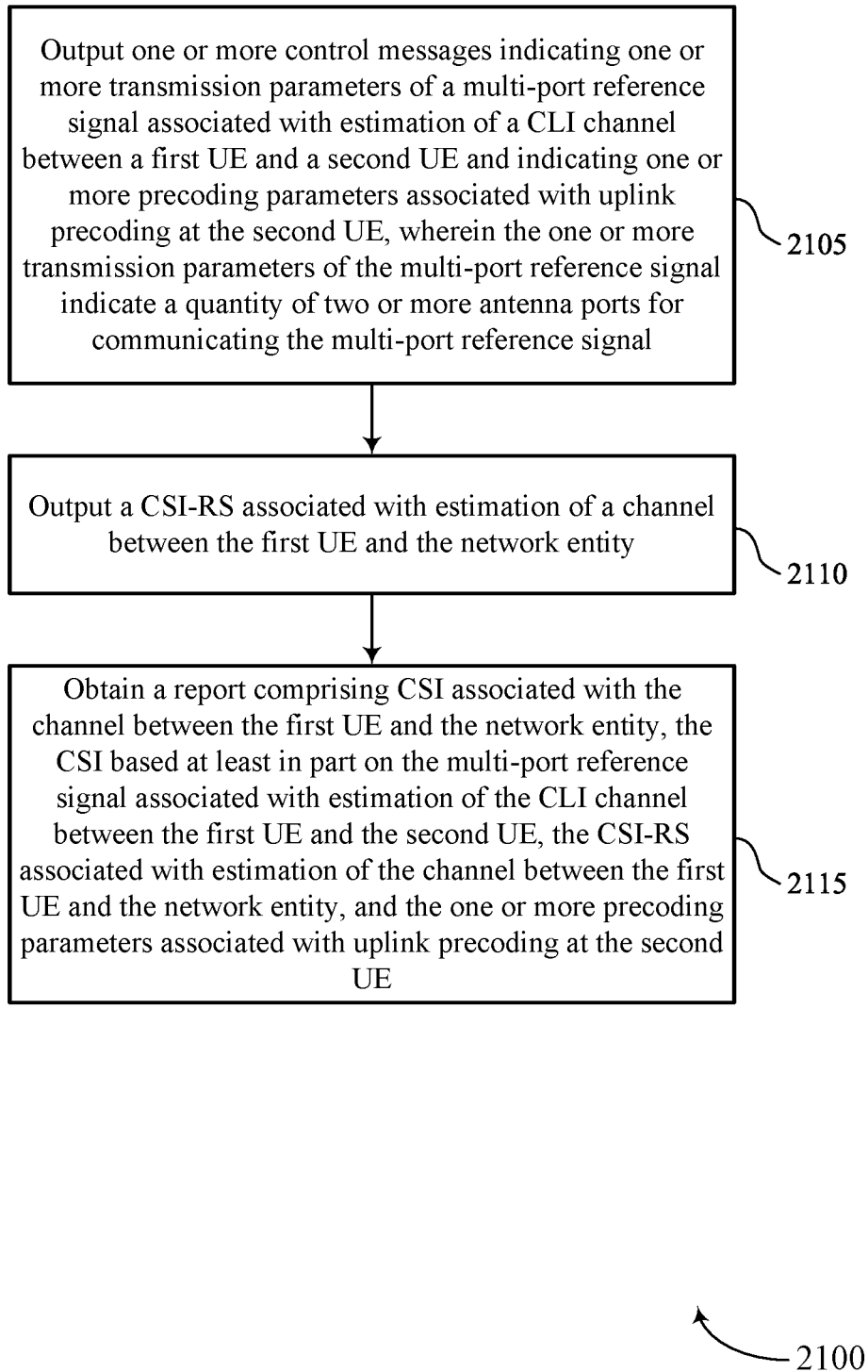

FIG. 21 shows a flowchart illustrating a method 2100 that supports CLI based CSI reporting in accordance with one or more aspects of the present disclosure. The operations of the method 2100 may be implemented by a network entity or its components as described herein. For example, the operations of the method 2100 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2105, the method may include outputting one or more control messages indicating one or more transmission parameters of a multi-port reference signal associated with estimation of a CLI channel between a first UE and a second UE and indicating one or more precoding parameters associated with uplink precoding at the second UE, where the one or more transmission parameters of the multi-port reference signal indicate a quantity of two or more antenna ports for communicating the multi-port reference signal. The operations of 2105 may be performed in accordance with examples as disclosed herein. In some examples, aspects of the operations of 2105 may be performed by a parameter component 1325 as described with reference to FIG. 13.

At 2110, the method may include outputting a CSI-RS associated with estimation of a channel between the first UE and the network entity. The operations of 2110 may be performed in accordance with examples as disclosed herein. In some examples, aspects of the operations of 2110 may be performed by a CSI-RS component 1330 as described with reference to FIG. 13.

At 2115, the method may include obtaining a report including CSI associated with the channel between the first UE and the network entity, the CSI based on the multi-port reference signal associated with estimation of the CLI channel between the first UE and the second UE, the CSI-RS associated with estimation of the channel between the first UE and the network entity, and the one or more precoding parameters associated with uplink precoding at the second UE. The operations of 2115 may be performed in accordance with examples as disclosed herein. In some examples, aspects of the operations of 2115 may be performed by a CSI report component 1335 as described with reference to FIG. 13.

Figure 22:
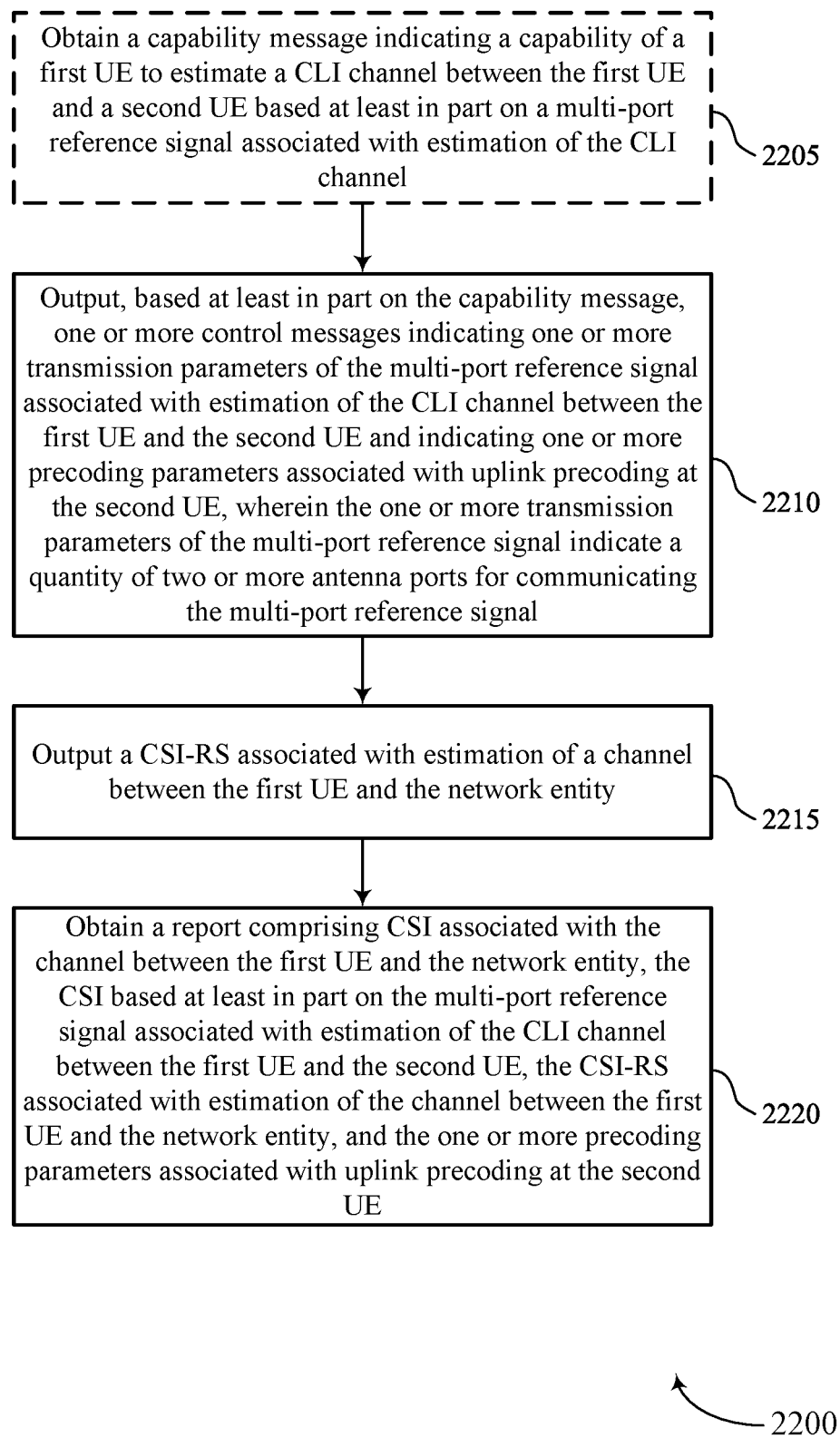

FIG. 22 shows a flowchart illustrating a method 2200 that supports CLI based CSI reporting in accordance with one or more aspects of the present disclosure. The operations of the method 2200 may be implemented by a network entity or its components as described herein. For example, the operations of the method 2200 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2205, the method may include obtaining a capability message indicating a capability of a first UE to estimate a CLI channel between the first UE and a second UE based on a multi-port reference signal associated with estimation of the CLI channel. The operations of 2205 may be performed in accordance with examples as disclosed herein. In some examples, aspects of the operations of 2205 may be performed by a capability component 1340 as described with reference to FIG. 13.

At 2210, the method may include outputting, based on the capability message, one or more control messages indicating one or more transmission parameters of the multi-port reference signal associated with estimation of the CLI channel between the first UE and the second UE and indicating one or more precoding parameters associated with uplink precoding at the second UE, where the one or more transmission parameters of the multi-port reference signal indicate a quantity of two or more antenna ports for communicating the multi-port reference signal. The operations of 2210 may be performed in accordance with examples as disclosed herein. In some examples, aspects of the operations of 2210 may be performed by a parameter component 1325 as described with reference to FIG. 13.

At 2215, the method may include outputting a CSI-RS associated with estimation of a channel between the first UE and the network entity. The operations of 2215 may be performed in accordance with examples as disclosed herein. In some examples, aspects of the operations of 2215 may be performed by a CSI-RS component 1330 as described with reference to FIG. 13.

At 2220, the method may include obtaining a report including CSI associated with the channel between the first UE and the network entity, the CSI based on the multi-port reference signal associated with estimation of the CLI channel between the first UE and the second UE, the CSI-RS associated with estimation of the channel between the first UE and the network entity, and the one or more precoding parameters associated with uplink precoding at the second UE. The operations of 2220 may be performed in accordance with examples as disclosed herein. In some examples, aspects of the operations of 2220 may be performed by a CSI report component 1335 as described with reference to FIG. 13.

Figure 23:
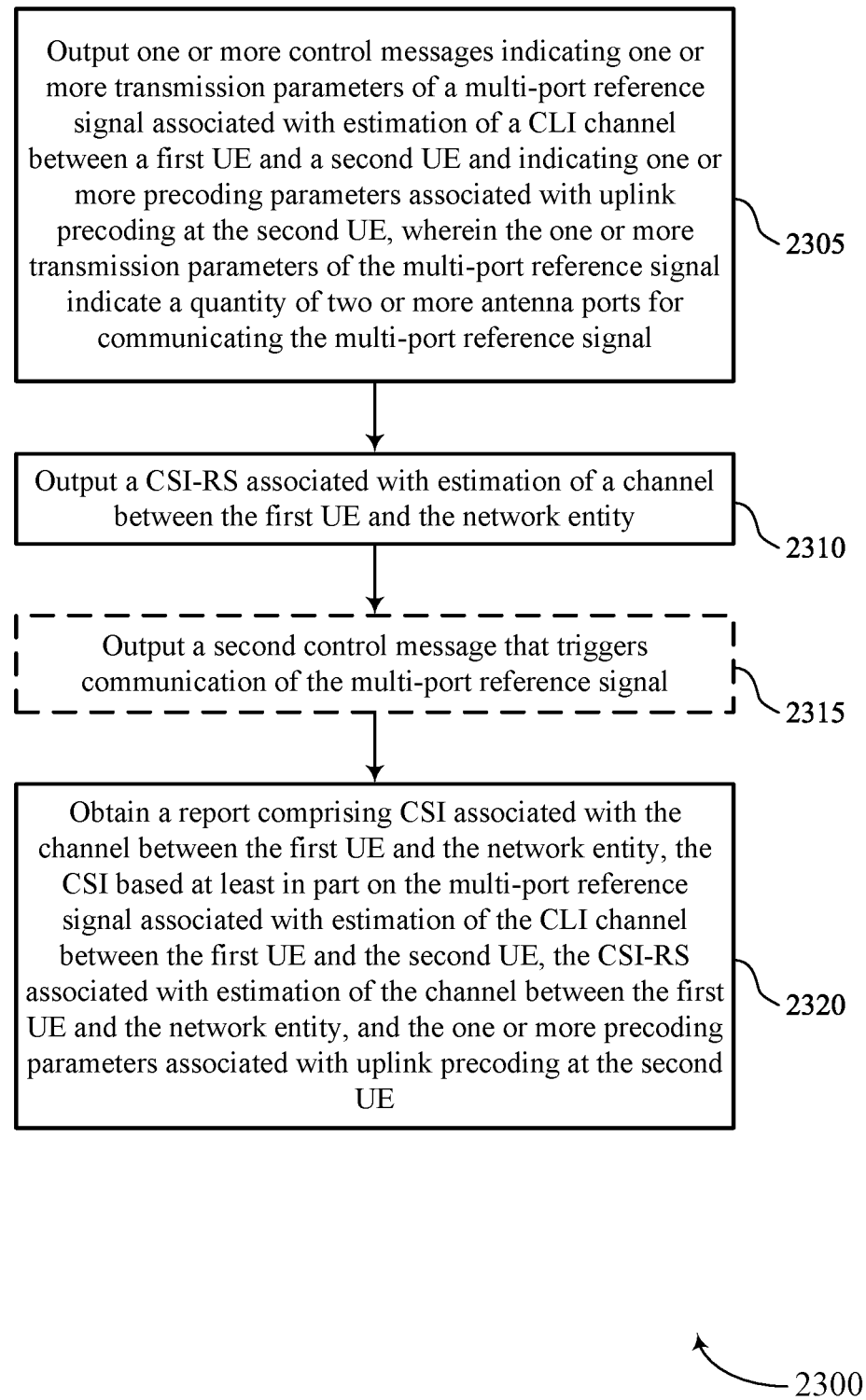

FIG. 23 shows a flowchart illustrating a method 2300 that supports CLI based CSI reporting in accordance with one or more aspects of the present disclosure. The operations of the method 2300 may be implemented by a network entity or its components as described herein. For example, the operations of the method 2300 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2305, the method may include outputting one or more control messages indicating one or more transmission parameters of a multi-port reference signal associated with estimation of a CLI channel between a first UE and a second UE and indicating one or more precoding parameters associated with uplink precoding at the second UE, where the one or more transmission parameters of the multi-port reference signal indicate a quantity of two or more antenna ports for communicating the multi-port reference signal. The operations of 2305 may be performed in accordance with examples as disclosed herein. In some examples, aspects of the operations of 2305 may be performed by a parameter component 1325 as described with reference to FIG. 13.

At 2310, the method may include outputting a CSI-RS associated with estimation of a channel between the first UE and the network entity. The operations of 2310 may be performed in accordance with examples as disclosed herein. In some examples, aspects of the operations of 2310 may be performed by a CSI-RS component 1330 as described with reference to FIG. 13.

At 2315, the method may include outputting a second control message that triggers communication of the multi-port reference signal. The operations of 2315 may be performed in accordance with examples as disclosed herein. In some examples, aspects of the operations of 2315 may be performed by a CLI-RS component 1345 as described with reference to FIG. 13.

At 2320, the method may include obtaining a report including CSI associated with the channel between the first UE and the network entity, the CSI based on the multi-port reference signal associated with estimation of the CLI channel between the first UE and the second UE, the CSI-RS associated with estimation of the channel between the first UE and the network entity, and the one or more precoding parameters associated with uplink precoding at the second UE. The operations of 2320 may be performed in accordance with examples as disclosed herein. In some examples, aspects of the operations of 2320 may be performed by a CSI report component 1335 as described with reference to FIG. 13.

The following provides an overview of aspects of the present disclosure:

Aspect 1: A method for wireless communication at a first UE, comprising: obtaining one or more control messages indicating one or more transmission parameters of a multi-port reference signal associated with estimation of a CLI channel between the first UE and a second UE and indicating one or more precoding parameters associated with uplink precoding at the second UE, wherein the one or more transmission parameters of the multi-port reference signal indicate a quantity of two or more antenna ports for communicating the multi-port reference signal; obtaining, using the quantity of two or more antenna ports, the multi-port reference signal associated with estimation of the CLI channel between the first UE and the second UE based at least in part on the one or more transmission parameters; obtaining a CSI-RS associated with estimation of a channel between the first UE and a network entity; and outputting a report comprising CSI that is based at least in part on the multi-port reference signal associated with estimation of the CLI channel between the first UE and the second UE, the CSI-RS associated with estimation of the channel between the first UE and the network entity, and the one or more precoding parameters associated with uplink precoding at the second UE.

Aspect 2: The method of aspect 1, further comprising: outputting a capability message indicating a capability of the first UE to estimate the CLI channel based at least in part on the multi-port reference signal, wherein the one or more control messages indicating the one or more transmission parameters of the multi-port reference signal are obtained based at least in part the capability message.

Aspect 3: The method of any of aspects 1 through 2, further comprising: generating the CSI based at least in part on the one or more control messages including an indication for the first UE to generate the CSI based at least in part on the multi-port reference signal, the CSI-RS, and the one or more precoding parameters.

Aspect 4: The method of any of aspects 1 through 2, further comprising: generating, based at least in part on the one or more transmission parameters of the multi-port reference signal indicating a measurement resource for the multi-port reference signal, the CSI based at least in part on the multi-port reference signal, the CSI-RS, and the one or more precoding parameters.

Aspect 5: The method of any of aspects 1 through 4, further comprising: estimating the channel between the first UE and the network entity based at least in part on the CSI reference signal, the CLI channel, and the one or more precoding parameters associated with uplink precoding at the second UE, the CSI based at least in part on the estimated channel.

Aspect 6: The method of aspect 5, further comprising: estimating the channel between the first UE and the network entity using a linear transformation associated with uncorrelation of antenna ports of the first UE used to receive the CSI-RS, the linear transformation based at least in part on the CLI channel and the one or more precoding parameters associated with uplink precoding at the second UE; and computing a spectral efficiency associated with candidate CSI based at least in part on the linear transformation, the report comprising the candidate CSI based at least in part on the computed spectral efficiency.

Aspect 7: The method of any of aspects 1 through 6, further comprising: obtaining DCI that triggers reporting of the CSI that is based at least in part on the multi-port reference signal, the CSI-RS, and the one or more precoding parameters associated with uplink precoding at the second UE.

Aspect 8: The method of any of aspects 1 through 7, wherein the multi-port reference signal associated with estimation of the CLI channel is an SRS.

Aspect 9: The method of any of aspects 1 through 8, wherein the quantity of two or more antenna ports corresponds to a quantity of transmission antenna ports at the second UE.

Aspect 10: The method of any of aspects 1 through 9, wherein the CSI comprises a PMI, a CQI, an RI, or a combination thereof, that is selected based at least in part on the multi-port reference signal, the CSI-RS, and the one or more precoding parameters associated with uplink precoding at the second UE.

Aspect 11: A method for wireless communication at a second UE, comprising: obtaining a control message indicating one or more transmission parameters of a multi-port reference signal associated with estimation of a CLI channel between the second UE and a first UE, wherein the one or more transmission parameters of the multi-port reference signal indicate a quantity of two or more antenna ports for communicating the multi-port reference signal; and outputting, using the quantity of two or more antenna ports, the multi-port reference signal associated with estimation of the CLI channel between the second UE and the first UE based at least in part on the one or more transmission parameters.

Aspect 12: The method of aspect 11, further comprising: obtaining a second control message that triggers communication of the multi-port reference signal, wherein the multi-port reference signal is output in response to the second control message.

Aspect 13: The method of aspect 12, wherein the second control message comprises DCI that schedules an aperiodic resource for communicating the multi-port reference signal or DCI that activates a semi-persistent scheduling resource for communicating the multi-port reference signal.

Aspect 14: The method of any of aspects 11 through 13, wherein outputting the multi-port reference signal comprises: outputting the multi-port reference signal using an SRS codebook indicated by the one or more transmission parameters, the SRS codebook associated with uplink transmissions to a network entity.

Aspect 15: The method of any of aspects 11 through 13, wherein the multi-port reference signal is a multi-port SRS, and wherein outputting the multi-port reference signal comprises: outputting the multi-port SRS using a beam having a first beam width that is greater than a second beam width associated with SRS transmissions to a network entity.

Aspect 16: The method of any of aspects 11 through 15, wherein the multi-port reference signal is an SRS configured to enable the estimation of the CLI channel.

Aspect 17: The method of any of aspects 11 through 16, further comprising: obtaining a second control message indicating a TPMI associated with precoding of an uplink message, the TPMI based at least in part on the CLI channel between the second UE and the first UE; and outputting an uplink message using a precoding matrix indicated by the TPMI.

Aspect 18: The method of any of aspects 11 through 17, wherein the quantity of two or more antenna ports corresponds to a quantity of transmission antenna ports at the second UE.

Aspect 19: A method for wireless communication at a network entity, comprising: outputting one or more control messages indicating one or more transmission parameters of a multi-port reference signal associated with estimation of a CLI channel between a first UE and a second UE and indicating one or more precoding parameters associated with uplink precoding at the second UE, wherein the one or more transmission parameters of the multi-port reference signal indicate a quantity of two or more antenna ports for communicating the multi-port reference signal; outputting a CSI-RS associated with estimation of a channel between the first UE and the network entity; and obtaining a report comprising CSI associated with the channel between the first UE and the network entity, the CSI based at least in part on the multi-port reference signal associated with estimation of the CLI channel between the first UE and the second UE, the CSI-RS associated with estimation of the channel between the first UE and the network entity, and the one or more precoding parameters associated with uplink precoding at the second UE.

Aspect 20: The method of aspect 19, further comprising: obtaining a capability message that indicates a capability of the first UE to estimate the CLI channel based at least in part on the multi-port reference signal, wherein the one or more control messages that indicate the one or more transmission parameters of the multi-port reference signal are output based at least in part the capability message Aspect 21: The method of any of aspects 19 through 20, further comprising: outputting a second control message that triggers communication of the multi-port reference signal.

Aspect 22: The method of aspect 21, wherein the second control message comprises DCI that schedules an aperiodic resource for communicating the multi-port reference signal or DCI that activates a semi-persistent scheduling resource for communicating the multi-port reference signal.

Aspect 23: The method of any of aspects 19 through 22, further comprising: outputting DCI triggering reporting of the CSI that is based at least in part on the multi-port reference signal, the CSI-RS, and the one or more precoding parameters associated with uplink precoding at the second UE.

Aspect 24: The method of any of aspects 19 through 23, wherein the one or more transmission parameters of the multi-port reference signal indicate an SRS codebook for communicating the multi-port reference signal.

Aspect 25: The method of any of aspects 19 through 23, wherein the one or more transmission parameters of the multi-port reference signal indicate a beam for communicating the multi-port reference signal, the beam having a first beam width that is greater than a second beam width associated with SRS transmissions to the network entity.

Aspect 26: The method of any of aspects 19 through 25, wherein the multi-port reference signal associated with estimation of the CLI channel is an SRS.

Aspect 27: The method of any of aspects 19 through 26, further comprising: outputting a second control message including a TPMI associated with precoding an uplink message at the second UE, the TPMI based at least in part on the CSI associated with the channel between the first UE and the network entity; and obtaining an uplink message in accordance with a precoding matrix indicated by the TPMI.

Aspect 28: An apparatus for wireless communication at a first UE, comprising a processor and memory coupled with the processor, the processor configured to perform a method of any of aspects 1 through 10.

Aspect 29: An apparatus for wireless communication at a first UE, comprising at least one means for performing a method of any of aspects 1 through 10.

Aspect 30: A non-transitory computer-readable medium storing code for wireless communication at a first UE, the code comprising instructions executable by a processor to perform a method of any of aspects 1 through 10.

Aspect 31: An apparatus for wireless communication at a second UE, comprising a processor and memory coupled with the processor, the processor configured to perform a method of any of aspects 11 through 18.

Aspect 32: An apparatus for wireless communication at a second UE, comprising at least one means for performing a method of any of aspects 11 through 18.

Aspect 33: A non-transitory computer-readable medium storing code for wireless communication at a second UE, the code comprising instructions executable by a processor to perform a method of any of aspects 11 through 18.

Aspect 34: An apparatus for wireless communication at a network entity, comprising a processor and memory coupled with the processor, the processor configured to perform a method of any of aspects 19 through 27.

Aspect 35: An apparatus for wireless communication at a network entity, comprising at least one means for performing a method of any of aspects 19 through 27.

Aspect 36: A non-transitory computer-readable medium storing code for wireless communication at a network entity, the code comprising instructions executable by a processor to perform a method of any of aspects 19 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc, in which case disks may reproduce data magnetically, whereas discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
    a processor; and
    memory coupled with the processor, the processor configured to:
        obtain one or more control messages that indicate one or more transmission parameters of a multi-port reference signal associated with estimation of a cross link interference channel between the first UE and a second UE, the one or more control messages indicating one or more precoding parameters associated with uplink precoding at the second UE, wherein the one or more transmission parameters of the multi-port reference signal indicate a quantity of two or more antenna ports to communicate the multi-port reference signal;
        obtain, using the quantity of two or more antenna ports, the multi-port reference signal associated with estimation of the cross link interference channel between the first UE and the second UE based at least in part on the one or more transmission parameters;
        obtain a channel state information-reference signal associated with estimation of a channel between the first UE and a network entity; and
        output a report comprising channel state information that is based at least in part on the multi-port reference signal associated with estimation of the cross link interference channel between the first UE and the second UE, the channel state information-reference signal associated with estimation of the channel between the first UE and the network entity, and the one or more precoding parameters associated with uplink precoding at the second UE.

2. The apparatus of claim 1, wherein the processor is further configured to:
    output a capability message that indicates a capability of the first UE to estimate the cross link interference channel based at least in part on the multi-port reference signal, wherein the one or more control messages indicating the one or more transmission parameters of the multi-port reference signal are obtained based at least in part on the capability message.

3. The apparatus of claim 1, wherein the processor is further configured to:
    generate the channel state information based at least in part on the one or more control messages including an indication for the first UE to generate the channel state information based at least in part on the multi-port reference signal, the channel state information-reference signal, and the one or more precoding parameters.

4. The apparatus of claim 1, wherein the processor is further configured to:
    generate, based at least in part on the one or more transmission parameters of the multi-port reference signal indicating a measurement resource for the multi-port reference signal, the channel state information based at least in part on the multi-port reference signal, the channel state information-reference signal, and the one or more precoding parameters.

5. The apparatus of claim 1, wherein the processor is further configured to:
    estimate the channel between the first UE and the network entity based at least in part on the channel state information-reference signal, the cross link interference channel, and the one or more precoding parameters associated with uplink precoding at the second UE, the channel state information based at least in part on the estimated channel.

6. The apparatus of claim 5, wherein the processor is further configured to:

estimate the channel between the first UE and the network entity using a linear transformation associated with uncorrelation of antenna ports of the first UE used to receive the channel state information-reference signal, the linear transformation based at least in part on the cross link interference channel and the one or more precoding parameters associated with uplink precoding at the second UE; and compute a spectral efficiency associated with candidate channel state information based at least in part on the linear transformation, wherein the report comprises the candidate channel state information based at least in part on the computed spectral efficiency.

7. The apparatus of claim 1, wherein the processor is further configured to:

obtain downlink control information that triggers reporting of the channel state information that is based at least in part on the multi-port reference signal, the channel state information-reference signal, and the one or more precoding parameters associated with uplink precoding at the second UE.

8. The apparatus of claim 1, wherein the multi-port reference signal associated with estimation of the cross link interference channel is a sounding reference signal.

9. The apparatus of claim 1, wherein the quantity of two or more antenna ports corresponds to a quantity of transmission antenna ports at the second UE.

10. The apparatus of claim 1, wherein the channel state information comprises a precoding matrix indicator, a channel quality indicator, a rank indicator, or a combination thereof, that is selected based at least in part on the multi-port reference signal, the channel state information-reference signal, and the one or more precoding parameters associated with uplink precoding at the second UE.

11. An apparatus for wireless communication at a second user equipment (UE), comprising:

a processor; and memory coupled with the processor, the processor configured to:

obtain a control message that indicates one or more transmission parameters of a multi-port reference signal associated with estimation of a cross link interference channel between the second UE and a first UE, wherein the one or more transmission parameters of the multi-port reference signal indicate a quantity of two or more antenna ports to communicate the multi-port reference signal; and output, using the quantity of two or more antenna ports, the multi-port reference signal associated with estimation of the cross link interference channel between the second UE and the first UE based at least in part on the one or more transmission parameters.

12. The apparatus of claim 11, wherein the processor is further configured to:

obtain a second control message that triggers communication of the multi-port reference signal, wherein the multi-port reference signal is output in response to the second control message.

13. The apparatus of claim 12, wherein the second control message comprises downlink control information that schedules an aperiodic resource to communicate the multi-port reference signal or downlink control information that activates a semi-persistent scheduling resource to communicate the multi-port reference signal.

14. The apparatus of claim 11, wherein, to output the multi-port reference signal, the processor is configured to:

output the multi-port reference signal using a sounding reference signal codebook indicated by the one or more transmission parameters, the sounding reference signal codebook associated with uplink transmissions to a network entity.

15. The apparatus of claim 11, wherein the multi-port reference signal is a multi-port sounding reference signal, and wherein, to output the multi-port reference signal, the processor is configured to:

output the multi-port sounding reference signal using a beam that has a first beam width that is greater than a second beam width associated with sounding reference signal transmissions to a network entity.

16. The apparatus of claim 11, wherein the multi-port reference signal is a sounding reference signal configured to enable the estimation of the cross link interference channel.

17. The apparatus of claim 11, wherein the processor is further configured to:

obtain a second control message that indicates a transmission precoding matrix indicator associated with precoding of an uplink message, the transmission precoding matrix indicator based at least in part on the cross link interference channel between the second UE and the first UE; and output an uplink message in accordance with a precoding matrix indicated by the transmission precoding matrix indicator.

18. The apparatus of claim 11, wherein the quantity of two or more antenna ports corresponds to a quantity of transmission antenna ports at the second UE.

19. An apparatus for wireless communication at a network entity, comprising:

a processor; and memory coupled with the processor, the processor configured to:

output one or more control messages that indicate one or more transmission parameters of a multi-port reference signal associated with estimation of a cross link interference channel between a first user equipment (UE) and a second UE and indicate one or more precoding parameters associated with uplink precoding at the second UE, wherein the one or more transmission parameters of the multi-port reference signal indicate a quantity of two or more antenna ports to communicate the multi-port reference signal;

output a channel state information-reference signal associated with estimation of a channel between the first UE and the network entity; and obtain a report comprising channel state information associated with the channel between the first UE and the network entity, the channel state information based at least in part on the multi-port reference signal associated with estimation of the cross link interference channel between the first UE and the second UE, the channel state information-reference signal associated with estimation of the channel between the first UE and the network entity, and the one or more precoding parameters associated with uplink precoding at the second UE.

20. The apparatus of claim 19, wherein the processor is further configured to:

obtain a capability message that indicates a capability of the first UE to estimate the cross link interference channel based at least in part on the multi-port reference signal, wherein the one or more control messages that indicate the one or more transmission parameters of the multi-port reference signal are output based at least in part on the capability message.

21. The apparatus of claim 19, wherein the processor is further configured to:
output a second control message that triggers communication of the multi-port reference signal.

22. The apparatus of claim 21, wherein the second control message comprises downlink control information that schedules an aperiodic resource to communicate the multi-port reference signal or downlink control information that activates a semi-persistent scheduling resource to communicate the multi-port reference signal.

23. The apparatus of claim 19, wherein the processor is further configured to:
output downlink control information triggering reporting of the channel state information that is based at least in part on the multi-port reference signal, the channel state information-reference signal, and the one or more precoding parameters associated with uplink precoding at the second UE.

24. The apparatus of claim 19, wherein the one or more transmission parameters of the multi-port reference signal indicate a sounding reference signal codebook to communicate the multi-port reference signal.

25. The apparatus of claim 19, wherein the one or more transmission parameters of the multi-port reference signal indicate a beam to communicate the multi-port reference signal, the beam associated with a first beam width that is greater than a second beam width associated with sounding reference signal transmissions to the network entity.

26. The apparatus of claim 19, wherein the multi-port reference signal associated with estimation of the cross link interference channel is a sounding reference signal.

27. The apparatus of claim 19, wherein the processor is further configured to:
output a second control message that includes a transmission precoding matrix indicator associated with precoding an uplink message at the second UE, the transmission precoding matrix indicator based at least in part on the channel state information associated with the channel between the first UE and the network entity; and
obtain an uplink message in accordance with a precoding matrix indicated by the transmission precoding matrix indicator.

28. A method for wireless communication at a first user equipment (UE), comprising:
obtaining one or more control messages indicating one or more transmission parameters of a multi-port reference signal associated with estimation of a cross link interference channel between the first UE and a second UE and indicating one or more precoding parameters associated with uplink precoding at the second UE, wherein the one or more transmission parameters of the multi-port reference signal indicate a quantity of two or more antenna ports for communicating the multi-port reference signal;
obtaining, using the quantity of two or more antenna ports, the multi-port reference signal associated with estimation of the cross link interference channel between the first UE and the second UE based at least in part on the one or more transmission parameters;
obtaining a channel state information-reference signal associated with estimation of a channel between the first UE and a network entity; and
outputting a report comprising channel state information that is based at least in part on the multi-port reference signal associated with estimation of the cross link interference channel between the first UE and the second UE, the channel state information-reference signal associated with estimation of the channel between the first UE and the network entity, and the one or more precoding parameters associated with uplink precoding at the second UE.

29. The method of claim 28, further comprising:
outputting a capability message indicating a capability of the first UE to estimate the cross link interference channel based at least in part on the multi-port reference signal, wherein the one or more control messages indicating the one or more transmission parameters of the multi-port reference signal are obtained based at least in part on the capability message.

30. The method of claim 28, further comprising:
generating the channel state information based at least in part on the one or more control messages including an indication for the first UE to generate the channel state information based at least in part on the multi-port reference signal, the channel state information-reference signal, and the one or more precoding parameters.

* * * * *